(12) United States Patent
Shiga

(10) Patent No.: US 12,709,506 B2
(45) Date of Patent: Aug. 18, 2026

(54) DRIVE TRANSMISSION DEVICE AND IMAGE FORMING APPARATUS INCORPORATING THE SAME

(71) Applicant: Yuuki Shiga, Kanagawa (JP)

(72) Inventor: Yuuki Shiga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 246 days.

(21) Appl. No.: 18/602,008

(22) Filed: Mar. 11, 2024

(65) Prior Publication Data

US 2024/0308800 A1 Sep. 19, 2024

(30) Foreign Application Priority Data

Mar. 14, 2023 (JP) ................................ 2023-039468
Oct. 16, 2023 (JP) ................................ 2023-178153

(51) Int. Cl.
*F16D 1/06* (2006.01)
*B65H 5/06* (2006.01)
*B65H 7/20* (2006.01)

(52) U.S. Cl.
CPC ............... *B65H 5/068* (2013.01); *B65H 7/20* (2013.01); *B65H 2403/20* (2013.01); *B65H 2403/48* (2013.01); *B65H 2403/73* (2013.01); *B65H 2403/80* (2013.01); *F16D 1/06* (2013.01)

(58) Field of Classification Search
CPC . F16D 1/0894; F16D 1/12; F16D 1/06; F16D 1/072; F16D 1/08; F16D 1/112; F16D 1/116; F16B 4/004; F16B 11/002; F16B 21/18; F16B 21/186; Y10T 403/7035; Y10T 403/7075
USPC .......................... 403/1, 314, 359.6, 376, 383
See application file for complete search history.

(56) References Cited

U.S. PATENT DOCUMENTS 6,400,914 B1 * 6/2002 Noda .................. G03G 15/757 399/167
10,429,786 B2 * 10/2019 Tomita .................. F16H 53/025
2011/0089629 A1 * 4/2011 Furusawa ................ B65H 7/14 271/227
2017/0343955 A1 11/2017 Shiga
(Continued)

FOREIGN PATENT DOCUMENTS

JP 06201020 A * 7/1994
JP 06213242 A * 8/1994 ............ F16D 1/072
(Continued)

*Primary Examiner* — Amber R Anderson
*Assistant Examiner* — Zachary A Hall
(74) *Attorney, Agent, or Firm* — Duft & Bornsen, PC

(57) ABSTRACT

A drive transmission device includes a drive transmission member and a rotation shaft. The drive transmission member has an insertion portion. The rotation shaft includes a press-fit portion and another flat portion. The press-fit portion press-fits into the insertion portion after insertion of an axial tip of the rotation shaft into the insertion portion and includes a press-fit flat portion parallel to an axial direction of the rotation shaft. The other flat portion is at a position closer to the axial tip than the press-fit flat portion. The insertion portion has an inner-wall flat portion to contact the press-fit flat portion when the press-fit portion is press-fitted into the insertion portion. The other flat portion is parallel to the press-fit flat portion that has a distance from an axial center of the rotation shaft smaller than the press-fit flat portion.

20 Claims, 14 Drawing Sheets

(56) References Cited

U.S. PATENT DOCUMENTS

| | | | |
|---|---|---|---|
| 2019/0018353 | A1 | 1/2019 | Tomita et al. |
| 2019/0225438 | A1 | 7/2019 | Aoyama et al. |
| 2019/0243296 | A1 | 8/2019 | Shiga et al. |
| 2021/0214176 | A1 | 7/2021 | Fukushima et al. |
| 2021/0221636 | A1 | 7/2021 | Wakabayashi et al. |

FOREIGN PATENT DOCUMENTS

| | | | |
|---|---|---|---|
| JP | 2009-036353 | A | 2/2009 |
| JP | 2019-020703 | A | 2/2019 |

* cited by examiner (a)
(b)
33
34
32
31
31a
H1
H2
C
35
W2
W1
36
36a

DRIVE TRANSMISSION DEVICE AND IMAGE FORMING APPARATUS INCORPORATING THE SAME

CROSS-REFERENCE TO RELATED APPLICATIONS

This patent application is based on and claims priority pursuant to 35 U.S.C. § 119(a) to Japanese Patent Application Nos. 2023-039468, filed on Mar. 14, 2023, and 2023-178153, filed on Oct. 16, 2023 in the Japan Patent Office, the entire disclosure of which is hereby incorporated by reference herein.

BACKGROUND

Technical Field

Embodiments of the present disclosure relate to a drive transmission device and an image forming apparatus.

Related Art

A drive transmission device is known that includes a drive transmission member and a rotation shaft. A driving force is transmitted to the drive transmission member from a drive source. The rotation shaft includes a press-fit portion that is press-fitted into an insertion portion of the drive transmission member after a leading end of the rotation shaft in an axial direction is inserted in the insertion portion of the drive transmission member.

SUMMARY

In an embodiment of the present disclosure, there is provided a drive transmission device that includes a drive transmission member and a rotation shaft. The drive transmission member receives a driving force from a drive source and has an insertion portion. The rotation shaft includes a press-fit portion and another flat portion. The press-fit portion press-fits into the insertion portion of the drive transmission member after insertion of an axial tip of the rotation shaft into the insertion portion of the drive transmission member and includes a press-fit flat portion parallel to an axial direction of the rotation shaft. The other flat portion is at a position closer to the axial tip than the press-fit flat portion. The insertion portion of the drive transmission member has an inner-wall flat portion to contact the press-fit flat portion when the press-fit portion is press-fitted into the insertion portion. The other flat portion is parallel to the press-fit flat portion that has a distance from an axial center of the rotation shaft smaller than the press-fit flat portion.

In another embodiment of the present disclosure, there is provided an image forming apparatus that includes the drive transmission device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 16A and 16B are cross-sectional views of the pulley and the rotation shaft according to the second modification, illustrating the movement from insertion of the rotation shaft into the insertion hole of the pulley to press-fitting of the rotation shaft into the insertion hole;

FIG. 19A is a cross-sectional view of the pulley and the rotation shaft according to the fourth modification, illustrating a state in which the pulley is properly pushed in until an entrance end surface of the pulley contacts a stopper wall of the rotation shaft;

FIG. 19B is a cross-sectional view of the pulley and the rotation shaft according to the fourth modification, illustrating a state in which pressing of the pulley is stopped midway before the entrance end surface of the pulley contacts the stopper wall of the rotation shaft;

Figure 1:
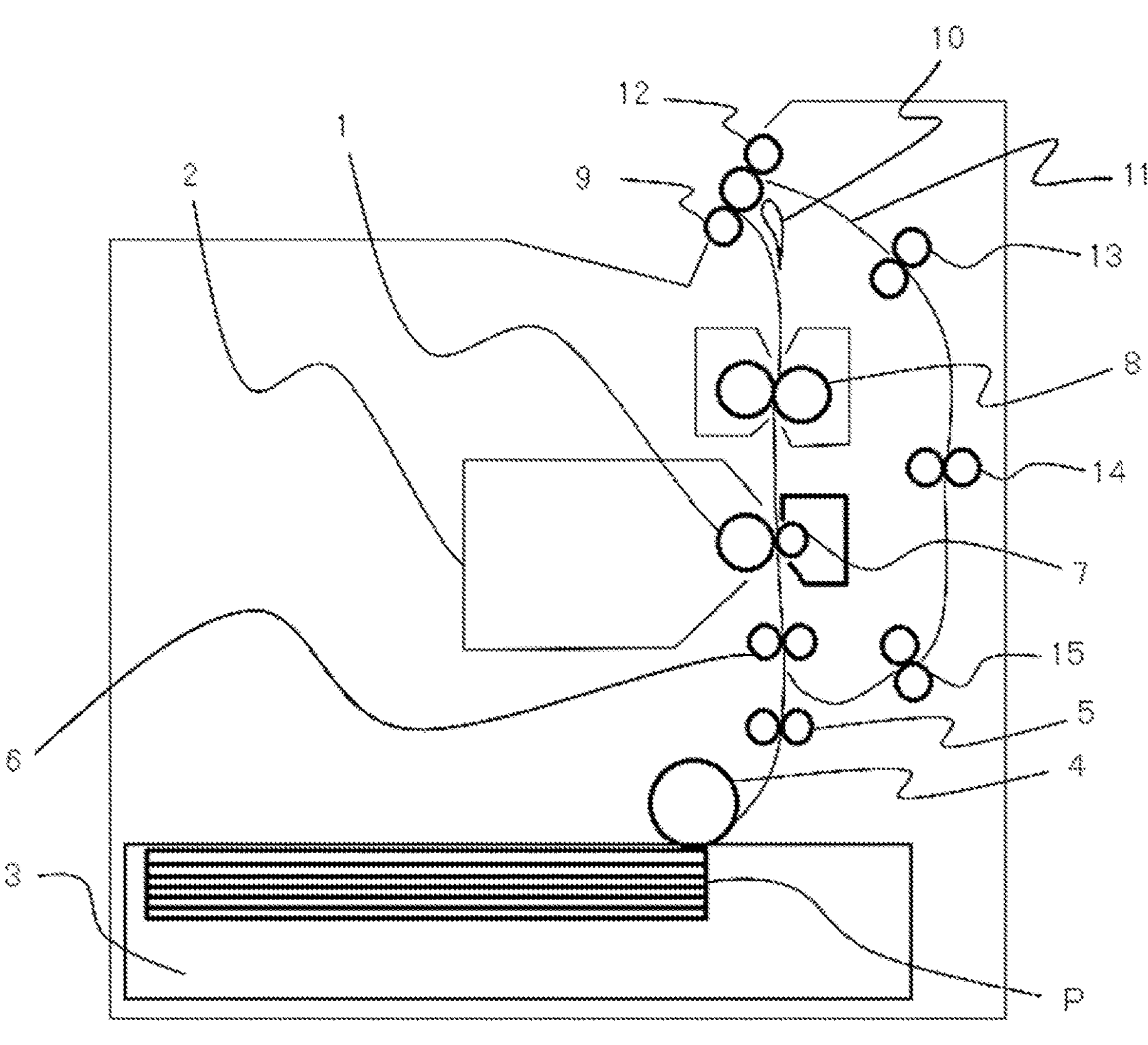
FIG. 1 is a schematic view of a printer serves as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given of an electrophotographic printer that serves as an image forming apparatus according to an embodiment of the present disclosure and forms images by electrophotography. In the following description, the electrophotographic printer is simply referred to as a printer.

FIG. 1 is a schematic view of a printer as an image forming apparatus according to an embodiment of the present disclosure. The printer illustrated in FIG. 1 is a monochrome printer, and includes an image forming device 2 in an apparatus body. The image forming device 2 includes, for example, a photoconductor 1 as an image bearer to bear an image on a surface thereof, a charging roller as a charging device to charge the surface of the photoconductor 1, a developing device to develop a latent image on the photoconductor 1 into a visible image, and a cleaning blade as a cleaning device to clean the surface of the photoconductor 1. A light-emitting diode (LED) head array is disposed around the photoconductor 1. The LED head array serves as an exposure device to expose the surface of the photoconductor 1.

When image formation starts, the photoconductor 1 of the image forming device 2 rotates counterclockwise in FIG. 1, and the charging roller uniformly charges the surface of the photoconductor 1 in a specified polarity. The LED head array irradiates the charged surface of the photoconductor 1 with a light beam based on image data input from an external device. Thus, an electrostatic latent image is formed on the surface of the photoconductor 1. The electrostatic latent image formed on the photoconductor 1 is developed into a toner image (visible image) with toner supplied by the developing device.

As the image formation starts, a transfer roller 7 rotates, and the specified voltage, which is either direct current (DC) voltage or alternating current (AC) voltage, or includes both, is applied to the transfer roller 7, thus forming a transfer electrical field between the transfer roller 7 and the photoconductor 1.

In a lower portion of the apparatus body, a feed roller 4 starts rotating, and the sheet P is fed out from a sheet tray 3. The fed sheet P is conveyed by a conveying roller pair 5 and conveyance is temporarily stopped by a registration roller pair 6. Thereafter, the rotation of the registration roller pair 6 is started at a specified timing, and the sheet P is conveyed to a transfer nip between the photoconductor 1 and the transfer roller 7 in synchronization with the timing at which the toner image on the photoconductor 1 reaches the transfer nip. The toner image on the photoconductor 1 is transferred onto the sheet P by a transfer electric field. Residual toner that remains on the photoconductor 1 without being transferred onto the sheet P is removed by the cleaning blade.

After the toner image is transferred onto the sheet P, the sheet P is conveyed to the fixing device 8 to fix the toner image onto the sheet P. The sheets P are ejected to the outside of the apparatus by an output roller pair 9 and are stacked on an output tray.

The printer according to the present embodiment includes a branching plate 10 of a claw shape in cross section for changing the conveyance direction of a sheet P and a reversing roller pair 12 for feeding the sheet P to a reverse conveyance path 11 in order to form images on both faces of the sheet P. One roller of the reversing roller pair 12 also serves as one roller of the output roller pair 9. The reverse conveyance path 11 is provided with a duplex entrance roller pair 13, a duplex intermediate roller pair 14, and a duplex exit roller pair 15.

In a case where images are formed on both sides of the sheet P, the branching plate 10 is rotated to switch the position of the branching plate 10 before the sheet P is conveyed from the fixing device 8 to the output roller pair 9. As a result, the conveyance route of the sheet P on which an image is formed on one side is switched, and the sheet P is sent to the reversing roller pair 12 rather than the output roller pair 9.

The sheet P conveyed to the reversing roller pair 12 is conveyed in the reverse direction at the timing at which the rear end of the sheet P does not completely pass through, and is conveyed to the reverse conveyance path 11. The sheet P passes through the reverse conveyance path 11 and is conveyed again to the transfer nip in a state where the front and back sides of the sheet P are reversed by the duplex entrance roller pair 13, the duplex intermediate roller pair 14, and the duplex exit roller pair 15 on the reverse conveyance path 11. An image is also transferred to the other side (back side) of the sheet P, is fixed by the fixing device 8, and is ejected by the output roller pair 9 to the outside of the apparatus.

Figure 2:
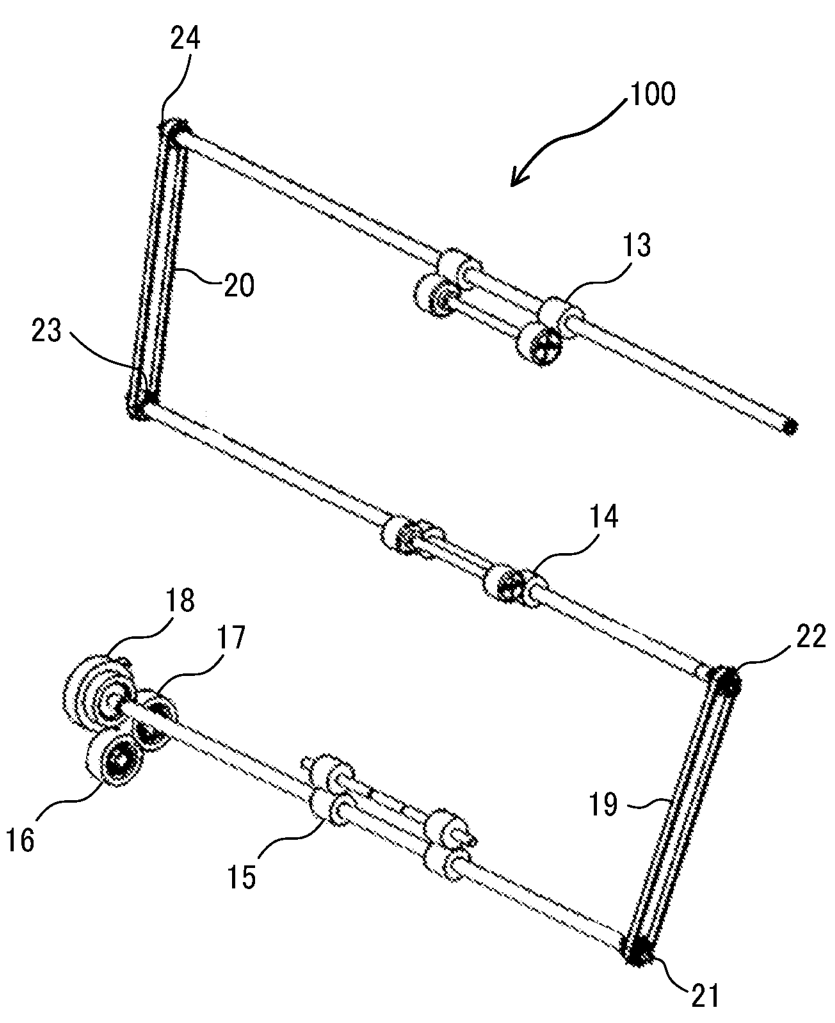
FIG. 2 is a perspective view of a driving mechanism for roller pairs in a reverse conveyance path of the printer, according to an embodiment of the present disclosure.

FIG. 2 is a perspective view of a driving mechanism 100 for the roller pairs 13, 14, and 15 in the reverse conveyance path. The driving mechanism 100 illustrated in FIG. 2 serves as a drive transmission device according to an embodiment of the present disclosure. A driving force from a drive source of the apparatus body is transmitted to a duplex clutch 18 disposed at a shaft end of one roller of the duplex exit roller pair 15 via idler gears 16 and 17. When the duplex clutch 18 is turned on at a specified timing, the duplex exit roller pair 15 rotates.

The duplex exit roller pair 15, the duplex intermediate roller pair 14, and the duplex entrance roller pair 13 operate in conjunction with each other via pulleys 21, 22, 23, and 24 and timing belts 19 and 20 stretched around the pulleys 21, 22, 23, and 24. The pulley 21 is disposed at a shaft end of the duplex exit roller pair 15, and the pulleys 22 and 23 are disposed at the shaft ends of the duplex intermediate roller pair 14. The pulley 24 is disposed at a shaft end of the duplex entrance roller pair 13. Accordingly, when the duplex exit roller pair 15 is rotated by a driving force from a drive source, the duplex intermediate roller pair 14 and the duplex entrance roller pair 13 also rotate in conjunction with each other.

Figure 3:
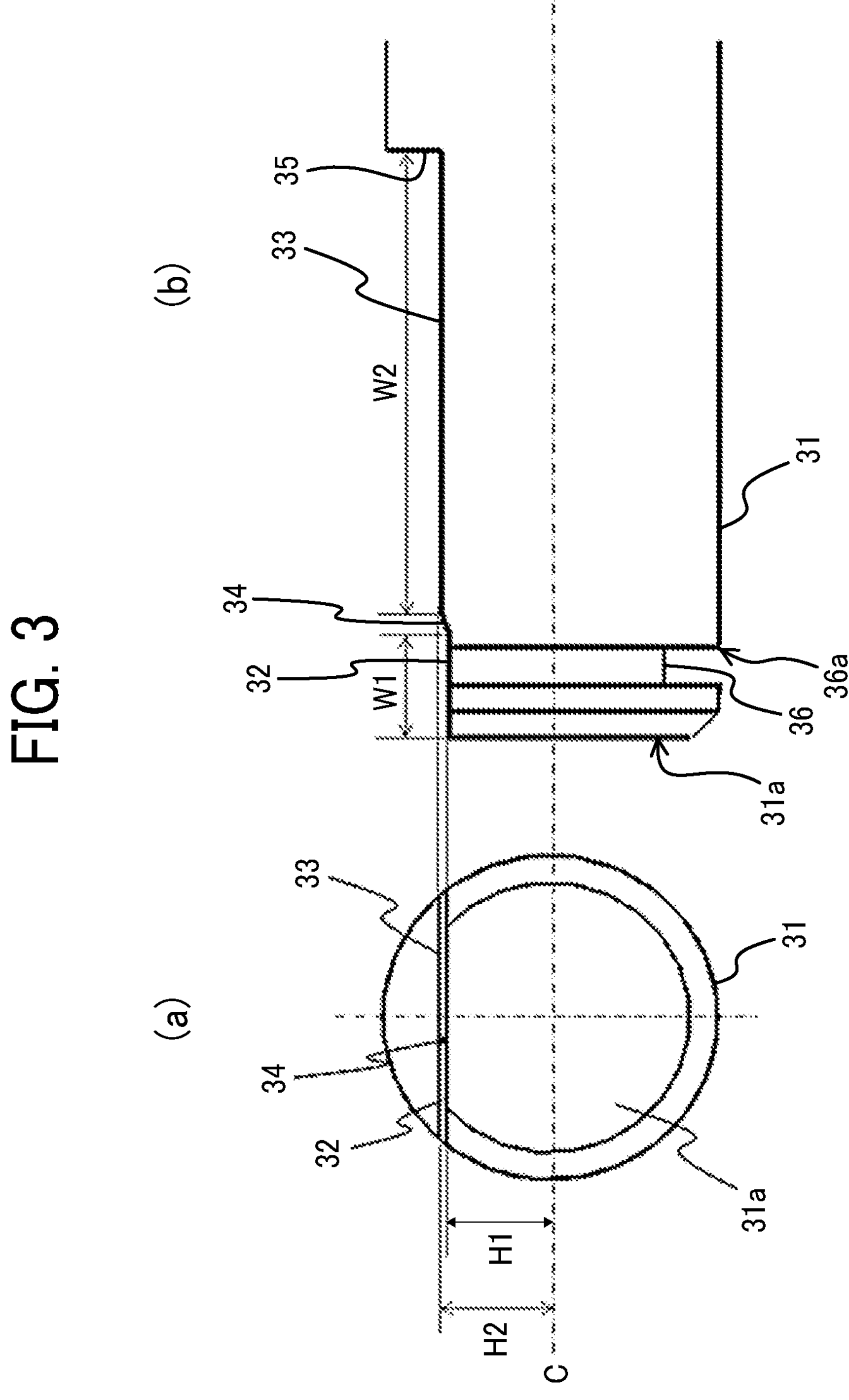
FIG. 3 is a schematic diagram illustrating a rotation shaft of one roller (driving roller) of a pair of duplex intermediate rollers in a reverse conveyance path, according to an embodiment of the present disclosure: part (a) is an enlarged front view of the rotation shaft viewed from an axial direction of the rotation shaft, and part (b) is an enlarged side view of the vicinity of a tip portion of the rotation shaft.
Figure 4:
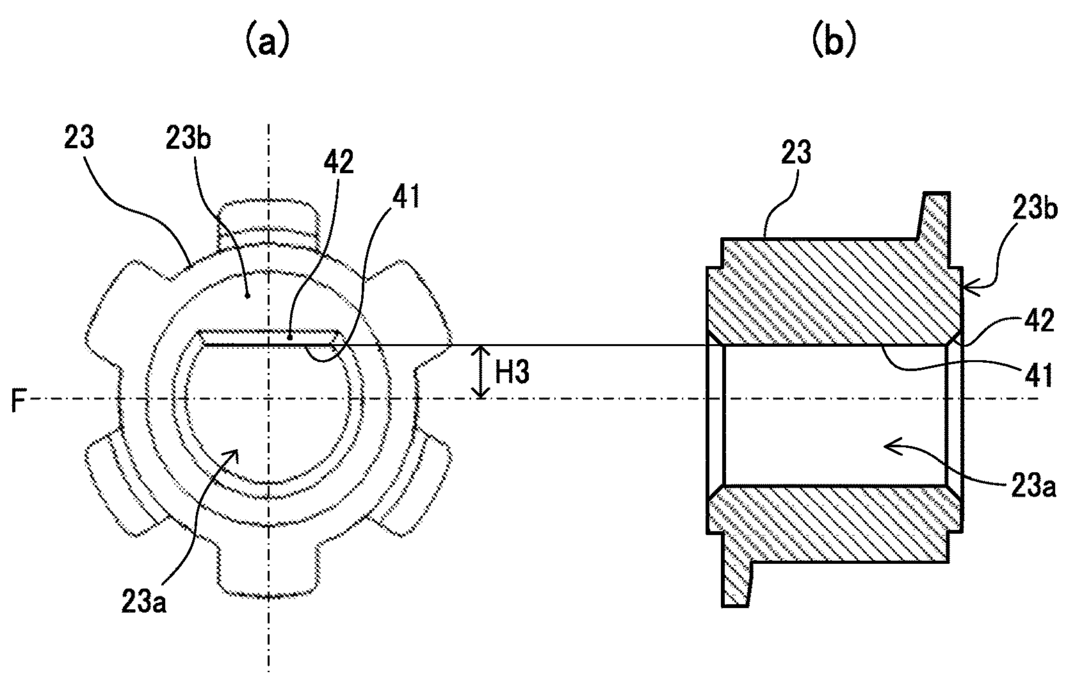
FIG. 4 is a schematic diagram illustrating a pulley to be held by the rotation shaft, according to an embodiment of the present disclosure: part (a) is a front view of the pulley viewed from the axial direction of the rotation shaft, and part (b) is a cross-sectional view of the pulley cut along the axial direction.

Part (a) of FIG. 3 is an enlarged front view of a rotation shaft 31 of one roller (drive roller) of the duplex intermediate roller pair 14, viewed from the axial direction of the rotation shaft 31. Part (b) of FIG. 3 is an enlarged side view of the vicinity of a tip end of the rotation shaft 31 in the axial direction. Part (a) of FIG. 4 is a front view of the pulley 23 held by the rotation shaft 31 of the duplex intermediate roller pair 14, viewed from the axial direction of the rotation shaft 31. Part (b) of FIG. 4 is a sectional view of the pulley 23 cut along the axial direction.

A description is given of an example of the assembly of the rotation shaft 31 that is a rotation shaft of the duplex intermediate roller pair 14 and the pulley 23 that is a drive transmission member. The present disclosure is also applicable to an example the assembly of the duplex intermediate roller pair 14 and the duplex exit roller pair 15, and the pulleys 21, 22, and 24. The present disclosure is not limited to the assembly of the rotation shaft of the roller and the pulley as described above, and can be similarly applied to the assembly of a rotation shaft and a drive transmission member (another drive transmission member such as a gear other than the pulley) disposed in the printer or another apparatus.

As illustrated in part (b) of FIG. 3, the rotation shaft 31 has a cross section of D-cut shape in which two flat portions 32 and 33 are arranged at mutually different positions in the axial direction over a certain range from an axial tip 31*a*. The flat portions 32 and 33 are formed so that distances H1 and H2 from an axial center C are different from each other. Specifically, the distance H1 from the axial center C of the leading flat portion 32 closer to the axial tip 31*a* is smaller than the distance H2 from the axial center C of the trailing flat portion 33 farther from the axial tip 31*a*.

The pulley 23 has an insertion hole 23*a* that is a through hole as an insertion portion into which the rotation shaft 31 having the D-cut shape in cross section is inserted. An inner-wall flat portion 41 is formed on an inner-wall surface of the insertion hole 23*a*. The inner-wall flat portion 41 contacts the trailing flat portion 33, which is a press-fit flat portion of the rotation shaft 31, when the rotation shaft 31 is press-fitted in the pulley 23. The relation among a distance H3 between the inner-wall flat portion 41 and the pulley center F, the distance H1 between the leading flat portion 32 of the rotation shaft 31 and the axial center C of the rotation shaft 31, and the distance H2 between the trailing flat portion 33 of the rotation shaft 31 and the axial center C of the rotation shaft 31 is set as in the following Expression (1). The pulley center F of the pulley 23 coincides with the axial center C of the rotation shaft 31 after the rotation shaft 31 is press-fitted in the pulley 23.

$$H1 \leq H3 < H2: \quad \text{Expression (1)}$$

Figure 5:
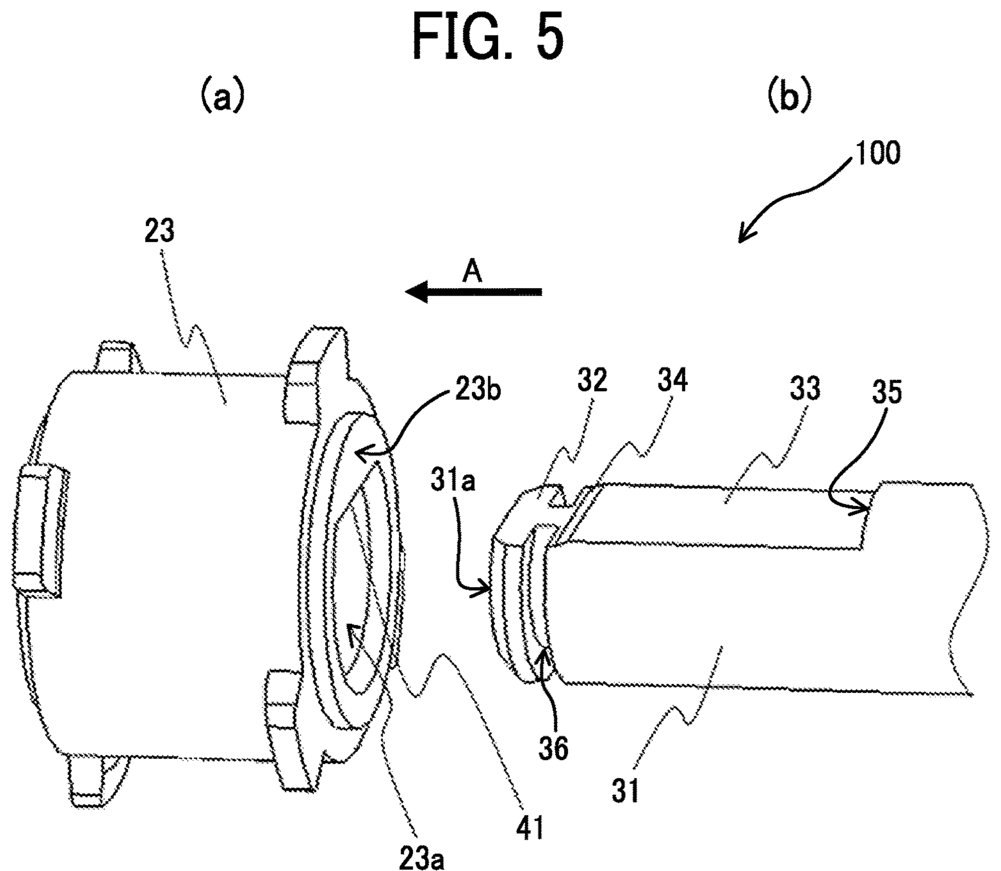
FIG. 5 is a perspective view of the pulley and the rotation shaft illustrating a state before the rotation shaft is inserted into an insertion hole of the pulley.

A description is given of an operation when the axial tip 31*a* of the rotation shaft 31 is inserted into the insertion hole 23*a* of the pulley 23 and the press-fit portion of the rotation shaft 31 is press-fitted into the insertion hole 23*a* of the pulley 23. FIG. 5 is a perspective view of the insertion hole 23*a* of the pulley 23 illustrating a state before the rotation shaft 31 is inserted into the insertion hole 23*a*. FIGS. 6A to 6D are cross-sectional views illustrating an operation from a time when the rotation shaft 31 is inserted into the insertion hole 23*a* of the pulley 23 to a time when the rotation shaft 31 is press-fitted into the insertion hole 23*a* of the pulley 23.

Figure 6A:
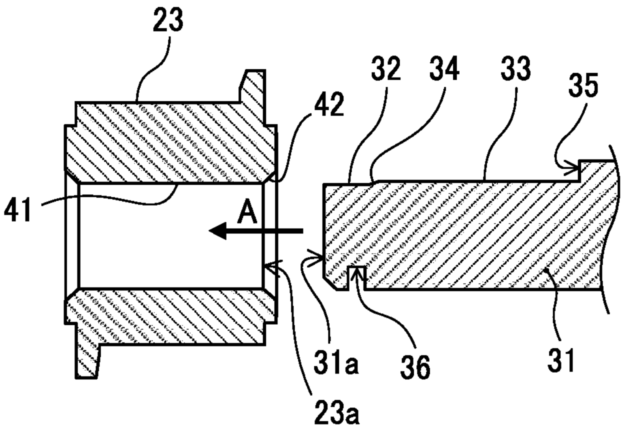
FIGS. 6A to 6D are cross-sectional views of the pulley and the rotation shaft illustrating the movement from insertion of the rotation shaft into the insertion hole of the pulley to press-fitting of the rotation shaft into the insertion hole.
Figure 6B:
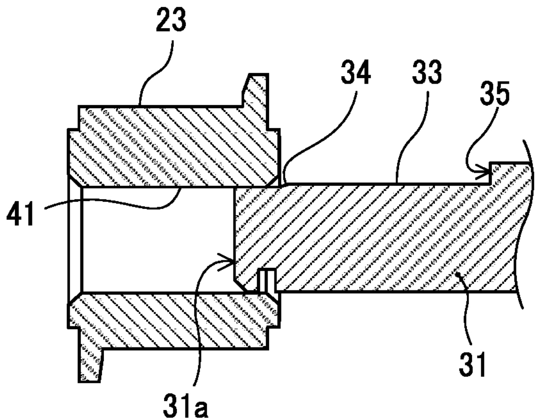

When the pulley 23 is assembled to the rotation shafts 31, as illustrated in FIGS. 5 and 6A, the axial tip 31*a* of the rotation shaft 31 is moved in the direction indicated by the arrow A in FIGS. 5 and 6A and inserted into the insertion hole 23*a* of the pulley 23. At this time, the rotation position of the rotation shaft 31 is adjusted such that the leading flat portion 32 of the rotation shaft 31 is substantially parallel to the inner-wall flat portion 41 of the insertion hole 23*a* of the pulley 23, and the axial tip 31*a* of the rotation shaft 31 is inserted into the insertion hole 23*a* of the pulley 23. As a result, as illustrated in FIG. 6B, the rotation position of the rotation shaft 31 is restricted such that the leading flat portion 32 be substantially parallel to the inner-wall flat portion 41 while the leading flat portion 32 of the rotation shaft 31 passes through the region facing the inner-wall flat portion 41 in the insertion hole 23*a* of the pulley 23.

Figure 7:
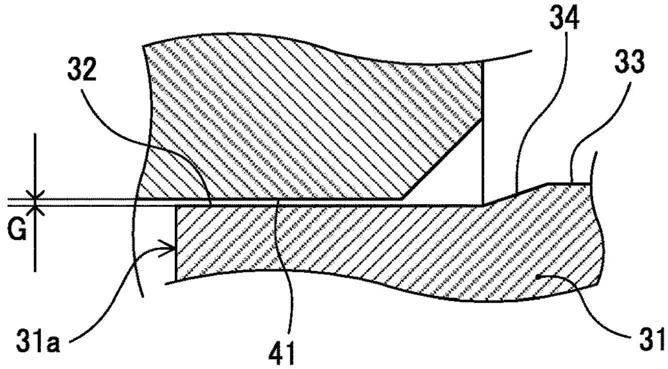
FIG. 7 is an enlarged view of the pulley and the rotation shaft in the state illustrated in FIG. 6B.

When the leading flat portion 32 of the rotation shaft 31 passes through the region facing the inner-wall flat portion 41 in the insertion hole 23*a* of the pulley 23, as illustrated in FIG. 7, a clearance G is generated between the leading flat portion 32 and the inner-wall flat portion 41. Accordingly, the rotation shaft 31 can be smoothly inserted into the insertion hole 23*a* of the pulley 23.

Figure 6C:
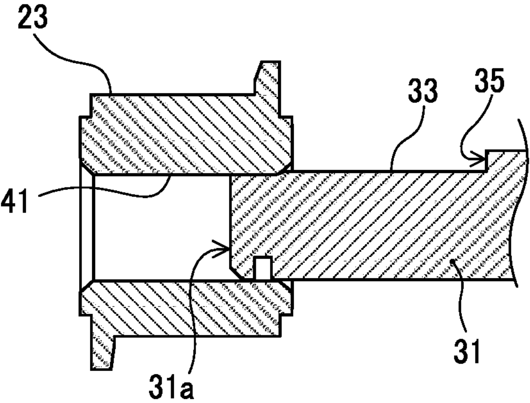
Figure 8:
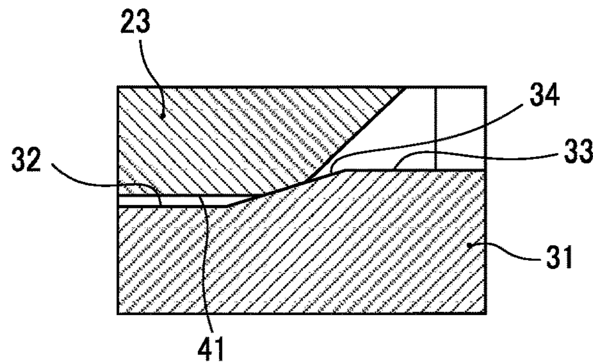
FIG. 8 is an enlarged view of the pulley and the rotation shaft in the state illustrated in FIG. 6C.

As the insertion further proceeds, as illustrated in FIG. 6C, the trailing flat portion 33 of the rotation shaft 31 enters the region facing the inner-wall flat portion 41 in the insertion hole 23*a* of the pulley 23. At this time, as illustrated in FIG. 8, an entrance edge portion 42 of the insertion hole 23*a* of the pulley 23 (the upstream end of the inner-wall flat portion 41 in the insertion direction A) contacts an inclined surface 34 of the rotation shaft 31. As the insertion further proceeds, the entrance edge portion 42 of the pulley 23 slides on the inclined surface 34 of the rotation shaft 31 and reaches the trailing flat portion 33 of the rotation shaft 31.

The pulley 23 according to the present embodiment is a resin-molded product and has lower rigidity than the rotation shaft 31 made of metal. Accordingly, the pulley 23 is press-fitted in the insertion hole 23*a* while being deformed until the entrance edge portion 42 of the pulley 23 reaches the trailing flat portion 33 while sliding on the inclined surface 34 of the rotation shaft 31. The pulley 23 is a resin-molded product so that, for example, the dimension of the inner-wall flat portion 41 (the distance H3 from the pulley center F) can be finely adjusted after the pulley 23 is molded, and a component with higher assemblability can be obtained.

Figure 6D:
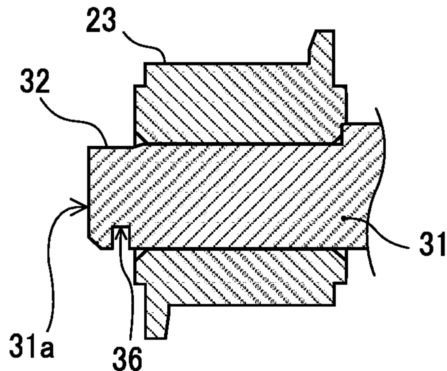
Figure 9:
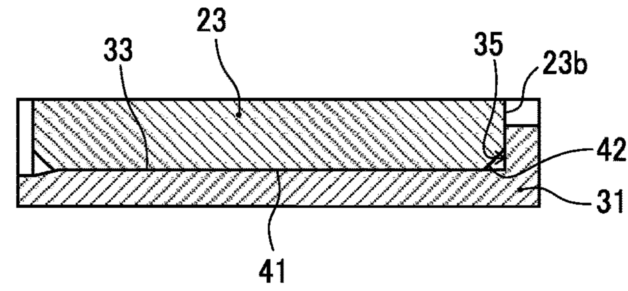
FIG. 9 is an enlarged view of the pulley and the rotation shaft in the state illustrated in FIG. 6D.

As the insertion (press-fitting) further proceeds, as illustrated in FIG. 6D, an entrance end surface 23*b* of the pulley 23 contacts a stopper wall 35 of the rotation shaft 31. As a result, as illustrated in FIG. 9, the trailing flat portion 33 of the rotation shaft 31 is press-fitted to contact the inner-wall flat portion 41 of the pulley 23, so that the pulley 23 is held by the rotation shaft 31. Such flat portions 33 and 41 are press-fitted in the insertion hole 23*a* in the state of contacting with each other, so that the pulley 23 is assembled to the rotation shaft 31 without rotation of the pulley 23 around the rotation shaft 31 and without inclination of the pulley 23 with respect to the rotation shaft 31.

In the present embodiment, as illustrated in FIG. 6B, the rotation position of the rotation shaft 31 is restricted such that the leading flat portion 32 be substantially parallel to the inner-wall flat portion 41 while the leading flat portion 32 of the rotation shaft 31 passes through the region facing the inner-wall flat portion 41 in the insertion hole 23*a* of the pulley 23. The rotation shaft 31 is further inserted into the insertion hole 23*a* while the rotation position of the rotation shaft 31 is restricted as described above, so that the insertion proceeds while the trailing flat portion 33 and the inner-wall flat portion 41 are also maintained in a substantially parallel state. As a result, such an operation in which the rotation shaft 31 inserted in the insertion hole 23*a* of the pulley 23 is rotated such that the trailing flat portion 33 of the rotation shaft 31 and the inner-wall flat portion 41 of the pulley 23 be in parallel to each other and the rotation position of the rotation shaft 31 is adjusted turns to be unnecessary, and the assemblability of the pulley 23 to the rotation shaft 31 is enhanced.

In the present embodiment, the trailing flat portion 33 of the two flat portions 32 and 33 provided for the rotation shaft 31 serves as a press-fit flat portion in a press-fit portion. The leading flat portion 32, which is another flat portion formed at a position closer to the axial tip 31*a* than the trailing flat portion 33, forms no press-fit portion. Accordingly, in the present embodiment, no inner-wall flat portion corresponding to the leading flat portion 32 is formed in the insertion hole 23*a* of the pulley 23. In the present embodiment, as illustrated in FIGS. 4B, 6A, 6B, 6C, and 6D, the inner-wall portion that is closer to the axial center C (the pulley center F) of the rotation shaft 31 than the inner-wall flat portion 41 is not placed in a region where the leading flat portion 32 faces from a time when the axial tip 31*a* of the rotation shaft 31 is inserted into the insertion hole 23*a* of the pulley 23 to a time when the press-fit portion (the trailing flat portion 33) is inserted into the insertion hole 23*a* of the pulley 23.

With such a configuration, the leading flat portion 32 of the rotation shaft 31 is not caught in any portion of the insertion hole 23*a* of the pulley 23 until the press-fit is performed, and thus the assemblability can be further enhanced.

In the present embodiment, the above-described configuration is achieved even if the axial tip 31*a* of the pulley 23 is inserted into the insertion hole 23*a* of the pulley 23 from either opening of the insertion hole 23*a* of the pulley 23. In other words, even if the axial tip 31*a* of the pulley 23 is inserted into the insertion hole 23*a* of the pulley 23 from either opening of the insertion hole 23*a* of the pulley 23, the insertion hole 23*a* of the pulley 23 has no portion to catch the leading flat portion 32 of the rotation shaft 31 until the press-fit is performed. In the present embodiment, the pulley 23 has a symmetrical shape, so that the pulley 23 can be properly assembled to the rotation shaft 31 even if the axial tip 31*a* of the pulley 23 is inserted into the insertion hole 23*a* of the pulley 23 from either opening of the insertion hole 23*a* of the pulley 23. As a result, the pulley 23 can be properly assembled regardless of the direction of the pulley 23, and thus further enhanced assemblability is achieved.

To achieve proper assembly without selecting the direction of the pulley 23 as described above, it is preferable that the press-fit flat portion constituting the press-fit portion of the rotation shaft 31 is only one portion, i.e., the trailing flat portion 33 as in the present embodiment. According to this configuration, a configuration in which the pulley 23 can be properly assembled regardless of the direction of the pulley 23 can be easily achieved.

In the present embodiment, an axial length W2 of the trailing flat portion 33 is longer than an axial length W1 of the leading flat portion 32. According to this configuration, the trailing flat portion 33 serving as the press-fit flat portion has an axial length that can sufficiently exert a force to hold the pulley 23 by press-fitting. On the other hand, the leading flat portion 32 serving as the non-press-fitted can achieve size reduction in the axial direction as much as possible in a range capable of ensuring an axial length enough to restrict the rotation of the rotation shaft 31 in the insertion hole 23*a* of the pulley 23.

Figure 10:
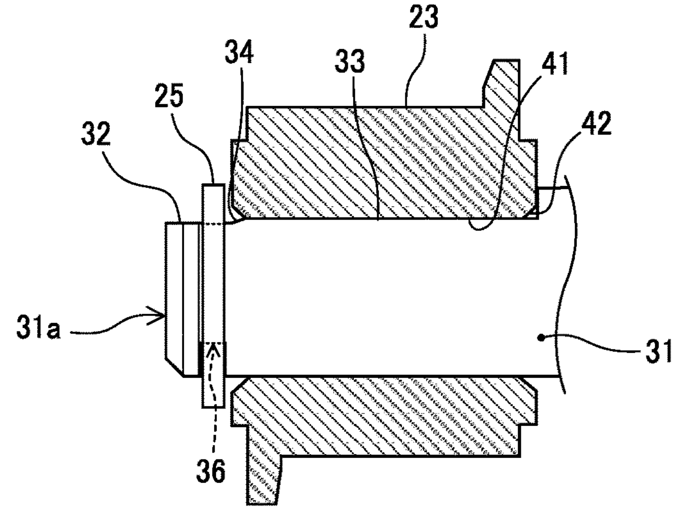
FIG. 10 is a cross-sectional view of the rotation shaft press-fitted in the pulley, with a stopper fitted in a groove of the rotation shaft.

FIG. 10 is a cross-sectional view of the rotation shaft 31 press-fitted to the insertion hole 23*a* of the pulley 23, illustrating a state in which a stopper 25 for preventing the pulley 23 from disengaging from the rotation shaft 31 is fitted in a groove 36 of the rotation shaft 31 after the press-fitting. In the present embodiment, as illustrated in FIG. 10, the rotation shaft 31 has the groove 36 in which the stopper 25 for preventing the rotation shaft 31 from disengaging from the insertion hole 23*a* is attached. The groove 36 is formed in a portion of the rotation shaft 31 that is positioned outside the insertion hole 23*a* after the rotation shaft 31 passes through the insertion hole 23*a* of the pulley 23 and is press-fitted in the insertion hole 23*a*. After the press-fitting, the stopper 25 is attached in the groove 36, so that the pulley 23 is held by the rotation shaft 31 with the axial movement of the pulley 23 restricted by the stopper 25 and the stopper wall 35 of the rotation shaft 31.

The leading flat portion 32 according to the present embodiment has a flat part positioned closer to the axial tip 31*a* than the position of the groove 36 in the axial direction. Due to the presence of such a flat part, when the insertion of the axial tip 31*a* of the rotation shaft 31 into the insertion hole 23*a* of the pulley 23 is started, the flat part of the leading flat portion 32 enters the insertion hole 23*a* before an edge 36*a* of the groove 36 enters the insertion hole 23*a*. According to this configuration, the flat part of the leading flat portion 32 is inserted along the inner-wall flat portion 41 in the insertion hole 23*a*, so that a situation in which the edge 36*a* of the groove 36 is caught by an entrance edge portion of the insertion hole 23*a* of the pulley 23 can be avoided. As a result, higher assemblability can be achieved.

First Modification

Figure 11:
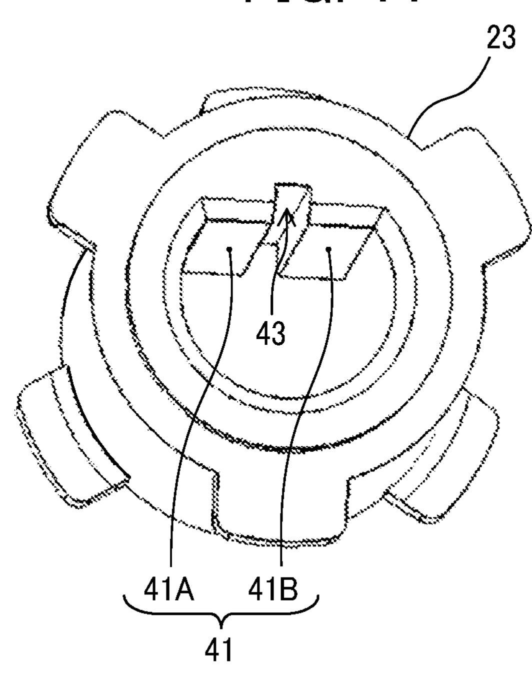
FIG. 11 is a perspective view of an example of a pulley according to a first modification of an embodiment of the present disclosure.

Next, a description is given of a modification of the above-described embodiment (hereinafter, the present modification is referred to as "the first modification"). FIG. 11 is a perspective view illustrating an example of the pulley 23 according to the first modification. In the first modification of FIG. 11, a notch 43 extending in the axial direction is formed in the inner-wall flat portion 41 formed in the insertion hole 23*a* of the pulley 23. Thus, the inner-wall flat portion 41 of the first modification of FIG. 11 is divided into two flat parts 41A and 41B. Such a configuration can reduce the area of contact between the rotation shaft 31 and the inner-wall flat portion 41, and thus can reduce the force required for insertion and press-fitting.

Figure 12:
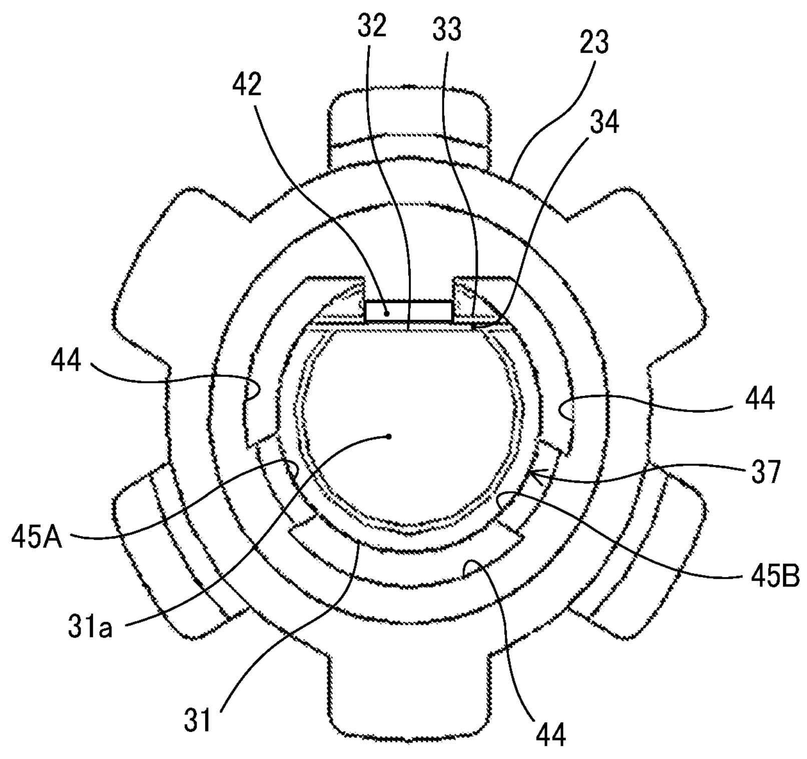
FIG. 12 is a front view of another example of the pulley according to the first modification, illustrating a rotation shaft pressed into an insertion hole of the pulley as viewed from an axial direction.
Figure 13:
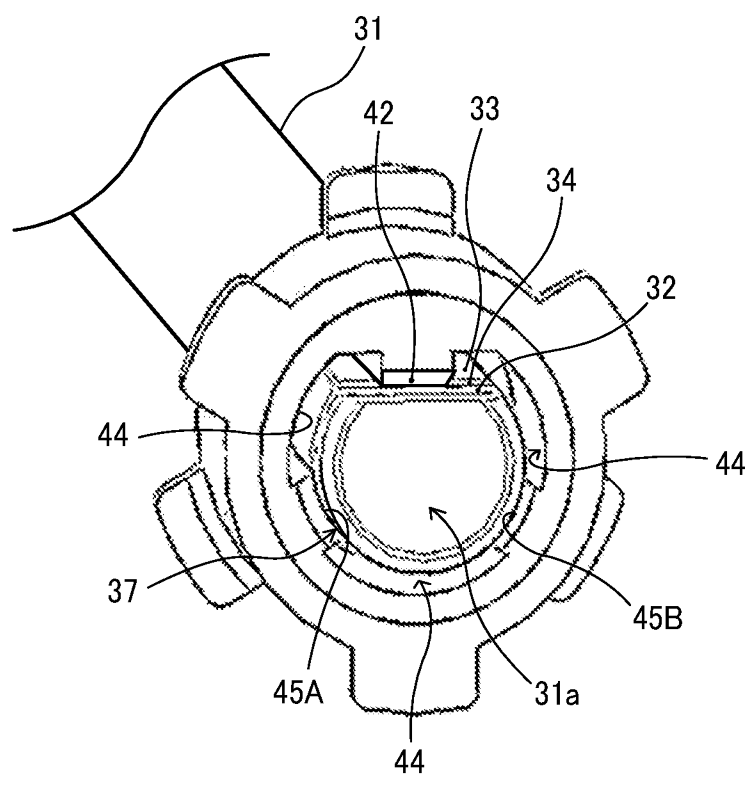
FIG. 13 is a perspective view of the pully of FIG. 12 and the rotation shaft press-fitted into the insertion hole of the pulley as viewed from an axial direction.

FIG. 12 is a front view of the rotation shaft 31 press-fitted into the insertion hole 23*a* of the pulley 23 as viewed from the axial direction. FIG. 13 is a perspective view of the rotation shaft 31 press-fitted into the insertion hole 23*a* of the pulley 23 as viewed from the axial direction. FIGS. 12 and 13 illustrate another example of the first modification in which a notch is formed in the insertion hole 23*a* of the pulley 23. In the first modification of FIGS. 12 and 13, the notch 44 extending in the axial direction is formed in an inner-wall curved surface portion 45 of the insertion hole 23*a* to come into contact with a curved surface portion 37 during press-fitting. The curved surface portion 37 is formed in the axial direction of the trailing flat portion 33 and forms the press-fit portion of the rotation shaft 31 together with the trailing flat portion 33. Accordingly, the inner-wall curved surface portion 45 of the first modification of FIGS. 12 and 13 is divided into two curved surface portions 45A and 45B. Such a configuration can reduce the area of contact between the rotation shaft 31 and the inner-wall curved surface portion 45 and can thus reduce the force required for insertion and press-fitting.

Second Modification

Figure 14:
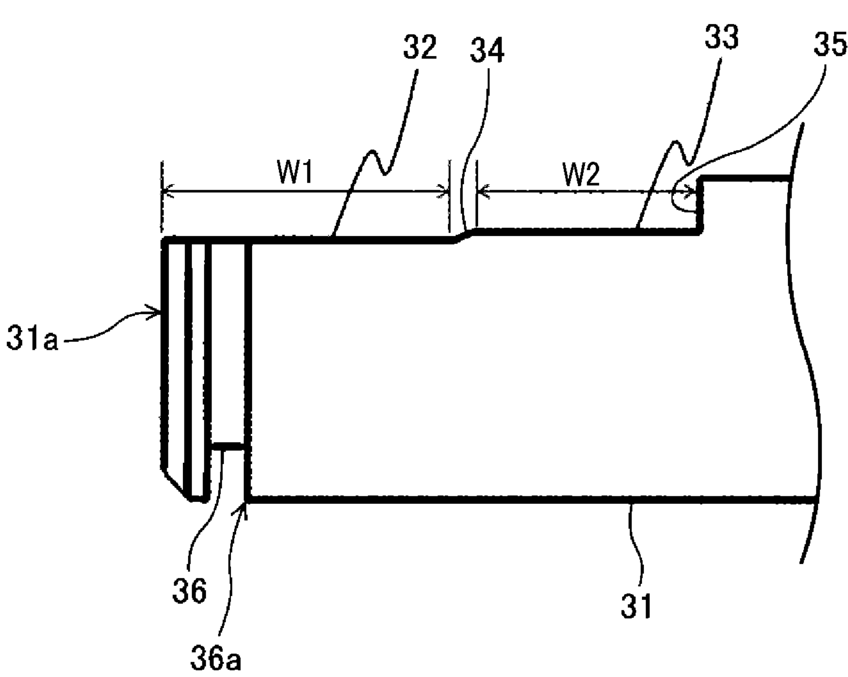
FIG. 14 is an enlarged side view of the vicinity of an axial tip of a rotation shaft according to a second modification of an embodiment of the present disclosure.
Figure 15:
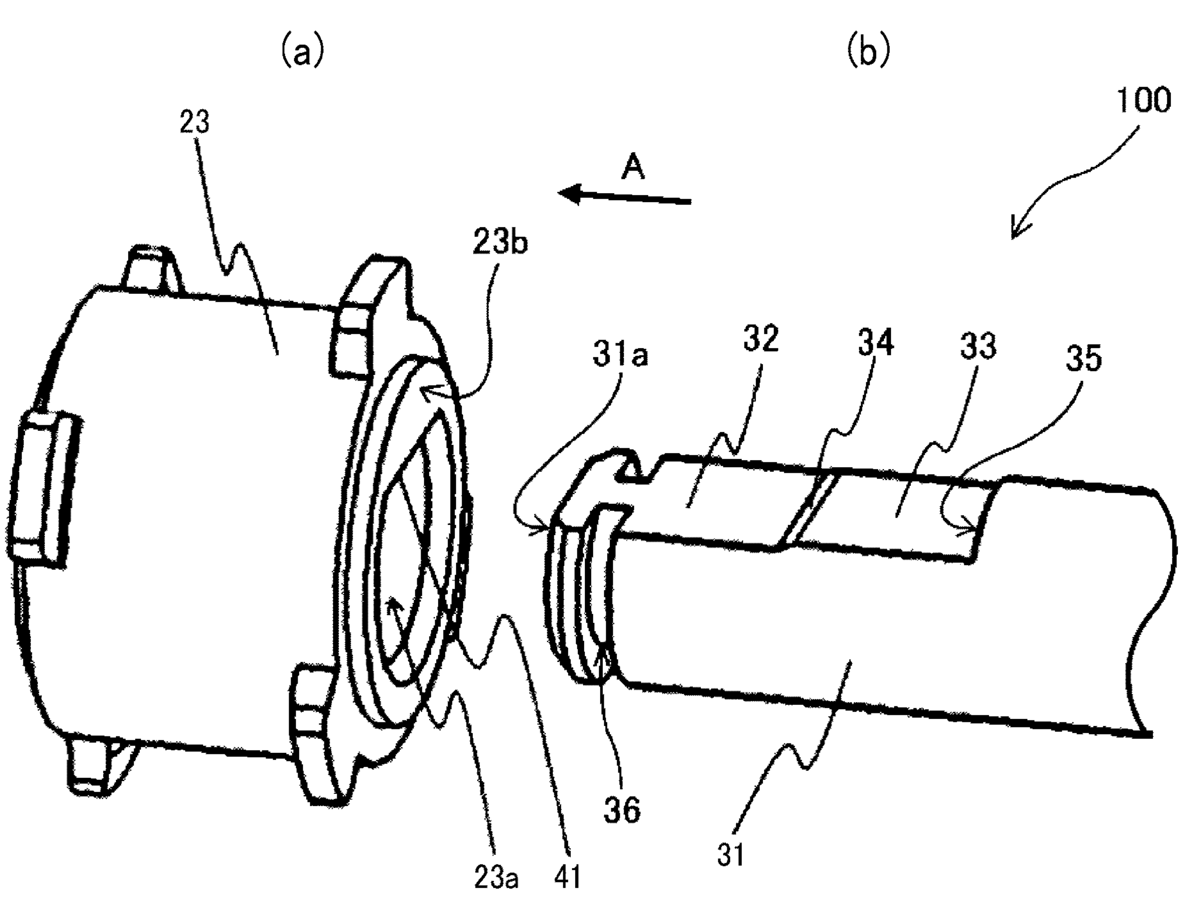
FIG. 15 is a perspective view of a pulley according to the second modification, illustrating a state before the rotation shaft is inserted into an insertion hole of the pulley.
Figures 16A, 16B:
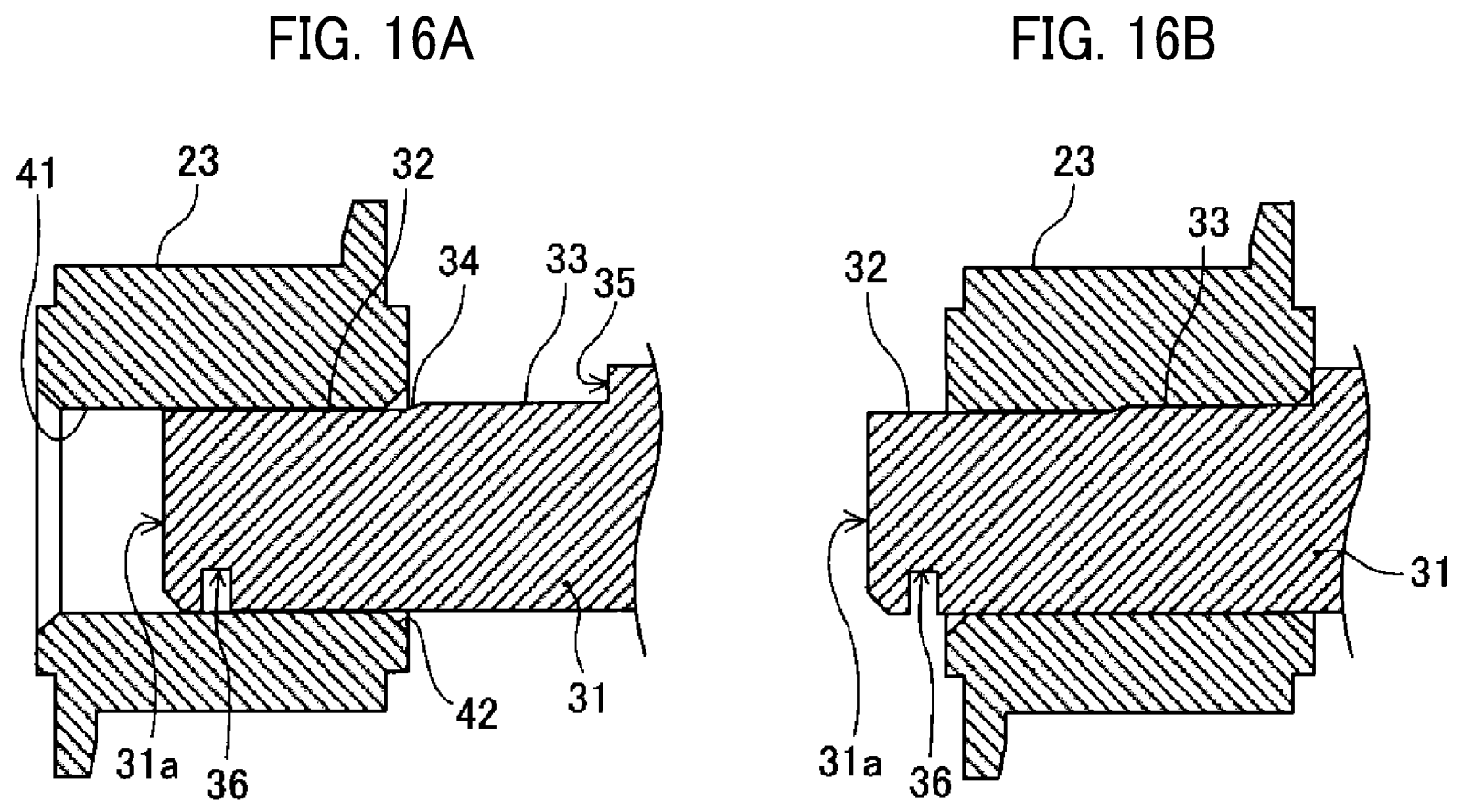

Next, a description is given of another modification of the above-described embodiment (hereinafter, the present modification is referred to as the "second modification"). FIG. 14 is an enlarged side view of the vicinity of an axial tip of the rotation shaft 31 according to the second modification. FIG. 15 is a perspective view of the pulley 23 and the rotation shaft 31, illustrating a state before the rotation shaft 31 is inserted into the insertion hole 23*a* of the pulley 23 in the second modification. FIGS. 16A and 16B are cross-sectional views of the pulley 23 and the rotation shaft 31, illustrating an operation from a time when the rotation shaft 31 is inserted into the insertion hole 23*a* of the pulley 23 to a time when the rotation shaft 31 is press-fitted into the insertion hole 23*a*.

In the second modification, as illustrated in FIG. 14, the axial length W2 of the trailing flat portion 33 of the rotation shaft 31 is equal to or less than the axial length W1 of the leading flat portion 32 of the rotation shaft 31. In other words, in the second modification, the axial length W2 of the trailing flat portion 33 that is the press-fit portion is set as short as possible within a range in which the force holding the pulley 23 by press-fit can be sufficiently exerted. Such a configuration can shorten the press-fit length (press-fit amount) when the pulley 23 is press-fitted into the rotation shaft 31. Accordingly, the time required for assembling (press-fitting) of the pulley 23 with respect to the rotation shaft 31 can be shortened.

Also in the second modification, when the leading flat portion 32 of the rotation shaft 31 passes through the region facing the inner-wall flat portion 41 in the insertion hole 23*a* of the pulley 23, as illustrated in FIG. 7, a clearance G is generated between the leading flat portion 32 and the inner-wall flat portion 41. Accordingly, the rotation shaft 31 can be smoothly inserted into the insertion hole 23*a* of the pulley 23. At this time, in the second modification, the axial length W2 of the leading flat portion 32 can be increased by the amount corresponding to the decrease in the axial length W1 of the trailing flat portion 33 serving as the press-fit portion. The leading flat portion 32 performs a function of adjusting the rotation position of the rotation shaft 31 such that the trailing flat portion 33 of the rotation shaft 31 and the inner-wall flat portion 41 of the pulley 23 be substantially parallel to each other before trailing flat portion 33 of the rotation shaft 31 is press-fitted into the insertion hole 23*a* of the pulley 23 as described above. According to the second modification, the axial length W1 of the leading flat portion 32 that performs such a function is increased, so that the trailing flat portion 33 of the rotation shaft 31 and the inner-wall flat portion 41 of the pulley 23 be stably and substantially parallel before the trailing flat portion 33 of the rotation shaft 31 and the inner-wall flat portion 41 of the pulley 23 are press-fitted, and thus the press-fitting of the trailing flat portion 33 and the inner-wall flat portion 41 can be more smoothly performed. As a result, the force is more easily applied to facilitate insertion in the press-fitting, and thus assemblability is enhanced.

Third Modification

Figure 17:
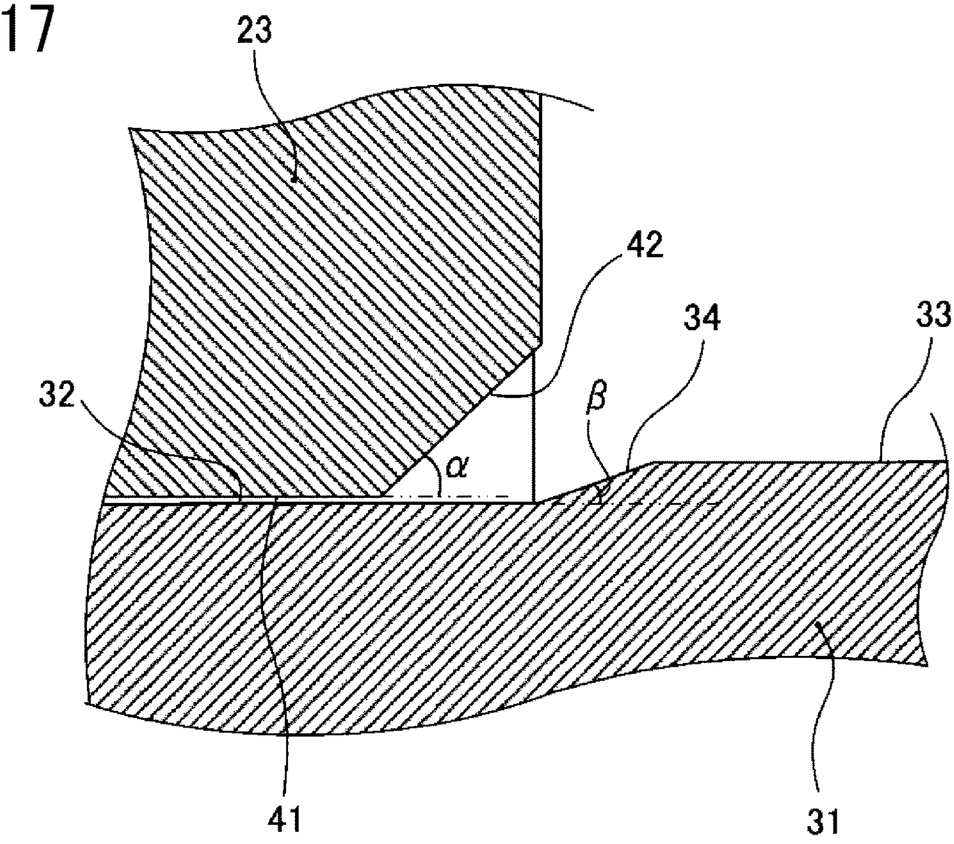
FIG. 17 is an enlarged cross-sectional view of a pulley and a rotation shaft according to a third modification of an embodiment of the present disclosure, illustrating a state immediately before an entrance edge portion of an insertion hole of the pulley contacts an inclined surface of the rotation shaft.

A description is given of still another modification of the above-described embodiment (hereinafter, the present modification is referred to as the "third modification"). FIG. 17 is an enlarged cross-sectional view of the pulley 23 and the rotation shaft 31 according to the third modification, illustrating a state immediately before the entrance edge portion 42 (an upstream end of the inner-wall flat portion 41 in the insertion direction A) of the insertion hole 23*a* of the pulley 23 contacts the inclined surface 34 of the rotation shaft 31.

In the third modification, the inclined surface 34 is provided on the rotation shaft 31 such that an angle β between the inclined surface 34 and the leading flat portion 32 at the most upstream position of the leading flat portion 32 in the insertion direction of the axial tip 31*a* of the rotation shaft 31 is equal to or less than an angle α between an inclined surface of the entrance edge portion 42 of the pulley 23 and the inner-wall flat portion 41. The angle α can also be said to be an angle formed by an imaginary line and the inclined surface of the entrance edge portion 42. The imaginary line extends in the opposite direction to the insertion direction A from the point at which the inclined surface of the entrance edge portion 42 and the inner-wall flat portion 41 intersect each other. The angle β can also be said to be an angle formed by an imaginary line and the inclined surface 34. The imaginary line extends in the opposite direction to the insertion direction A from the point at which the leading flat portion 32 and the inclined surface 34 intersect each other.

As described above, if there is a step between the leading flat portion 32 and the trailing flat portion 33 which is a press-fit portion, the step is caught in the pulley 23 and assemblability is disturbed. However, providing the inclined surface 34 can avoid a situation in which the step is caught in the pulley 23. With the configuration of the third modification, the angle between the direction of the external force that the inclined surface 34 receives from the entrance edge portion 42 and the inclined surface 34 decreases in a place where the entrance edge portion 42 of the insertion hole 23*a* of the pulley 23 contacts the inclined surface 34 of the rotation shaft 31. In other words, the direction of the external force that the inclined surface 34 receives from the entrance edge portion 42 is closer to the direction parallel to the inclined surface 34. Accordingly, the frictional force generated when the entrance edge portion 42 of the pulley 23 slides on the inclined surface 34 of the rotation shaft 31 during insertion decreases, and the load and catching during press-fitting decrease. Thus, higher assemblability can be obtained.

Fourth Modification

Figure 18:
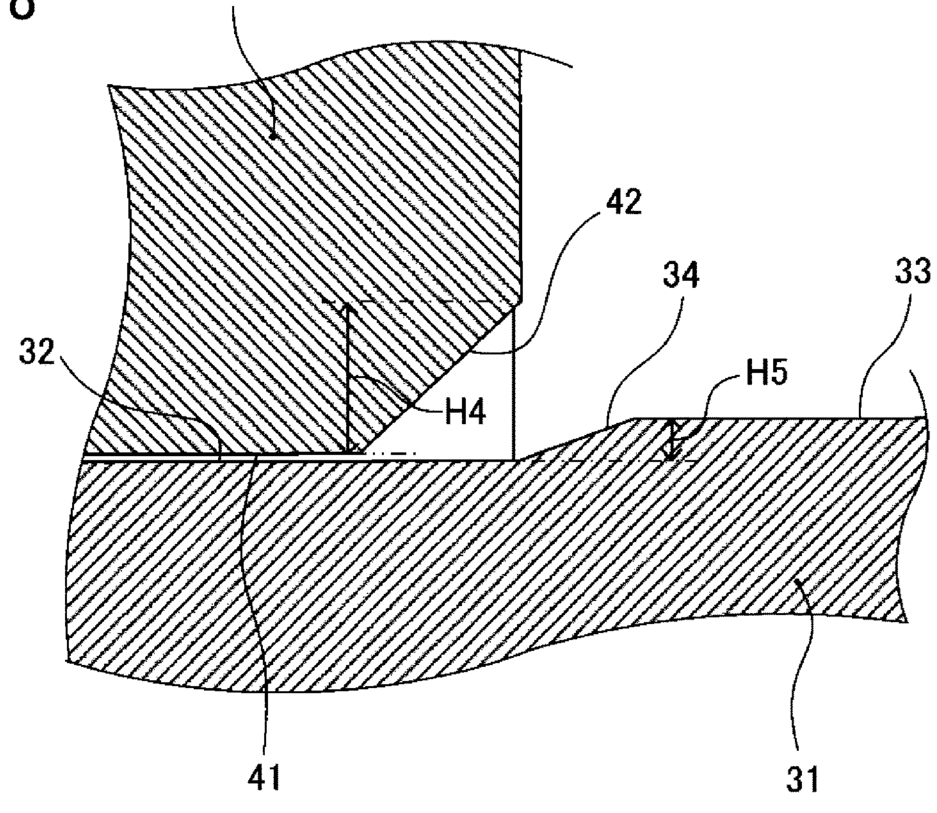
FIG. 18 is an enlarged cross-sectional view of a pulley and a rotation shaft according to a fourth modification of an embodiment of the present disclosure, illustrating a state immediately before an entrance edge portion of an insertion hole of the pulley contacts an inclined surface of the rotation shaft.

Next, a description is given of still another modification of the above-described embodiment (hereinafter, the present modification is referred to as the "fourth modification"). FIG. 18 is an enlarged cross-sectional view of the pulley 23 and the rotation shaft 31 according to the fourth modification, illustrating a state immediately before the entrance edge portion 42 (an upstream end of the inner-wall flat portion 41 in the insertion direction A) of the insertion hole 23*a* of the pulley 23 contacts the inclined surface 34 of the rotation shaft 31.

In the fourth modification, the inclined surface 34 is formed on the rotation shaft 31 such that a height H5 of the inclined surface 34 with respect to the leading flat portion 32 at the most upstream position of the leading flat portion 32 in the insertion direction of the axial tip 31*a* of the rotation shaft 31 is equal to or less than a height H4 of the inclined surface of the entrance edge portion 42 of the pulley 23 with respect to the inner-wall flat portion 41.

As described above, if there is a step between the leading flat portion 32 and the trailing flat portion 33 which is a press-fit portion, the step is caught in the pulley 23 and assemblability is disturbed. However, providing the inclined surface 34 can avoid a situation in which the step is caught in the pulley 23. With the configuration of the fourth modification, the height at which the entrance edge portion 42 of the insertion hole 23*a* of the pulley 23 rides on the trailing flat portion 33, which is the press-fit portion, along the inclined surface 34 is low. Accordingly, the load and catching during press-fitting are reduced, and thus higher assemblability can be obtained.

Fifth Modification

Figures 19A, 19B:
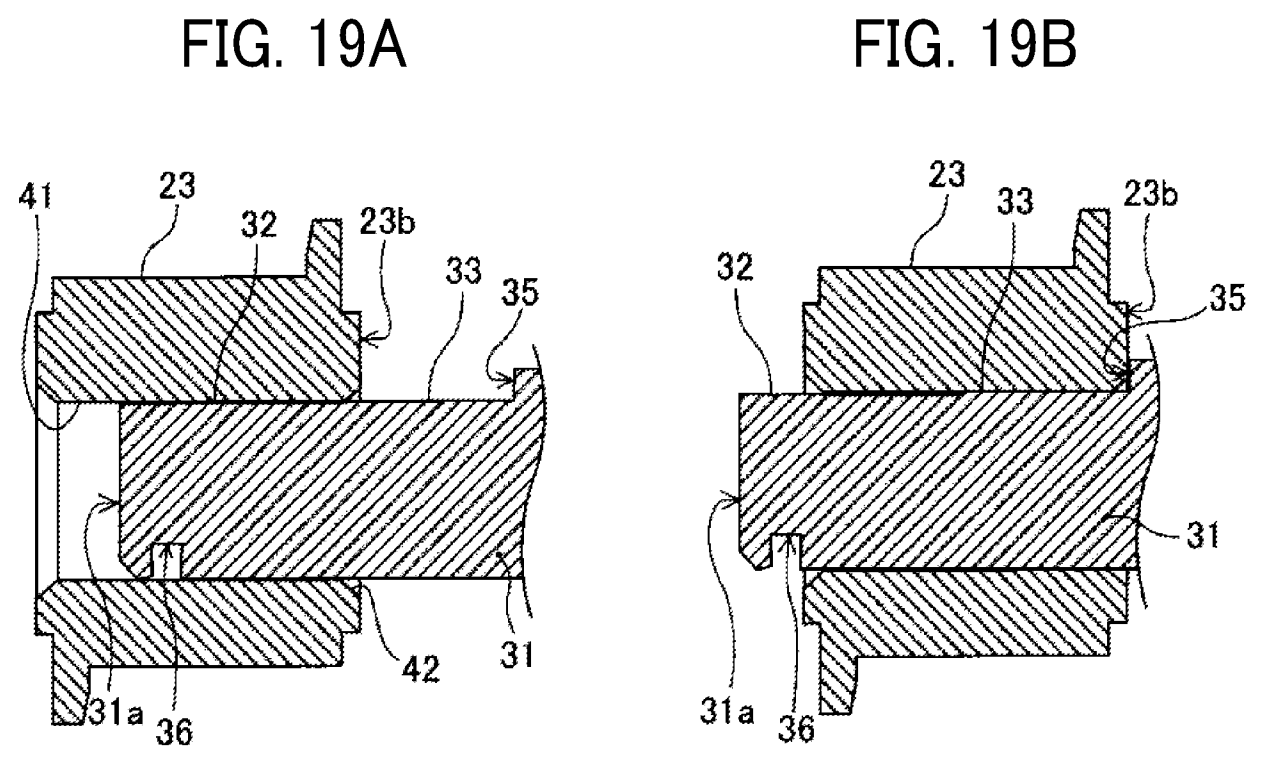

A description is given of still another modification of the above-described embodiment (hereinafter, the present modification is referred to as the "fifth modification"). When an assembly operator presses the pulley 23 to insert the rotation shaft 31 into the insertion hole 23*a* in the pulley 23, originally, as illustrated in FIG. 19A, the assembly operator presses the pulley 23 until the entrance end surface 23*b* of the pulley 23 contacts the stopper wall 35 of the rotation shaft 31. As illustrated in FIG. 19B, however, the assembly operator may stop pressing (insertion) of the pulley 23 before the trailing flat portion 33 of the rotation shaft 31 contacts the inner-wall flat portion 41 of the pulley 23 or in a state where the trailing flat portion 33 of the rotation shaft 31 contacts the inner-wall flat portion 41 of the pulley 23 but the entrance end surface 23*b* of the pulley 23 does not contact the stopper wall 35 of the rotation shaft 31. This is because the assembly operator may mistakenly think that the pulley 23 is inserted by a certain length and thus further pushing (insertion) is not necessary, or that the pulley cannot be moved any more when the force is applied and thus further pushing (insertion) is not necessary.

Figure 20:
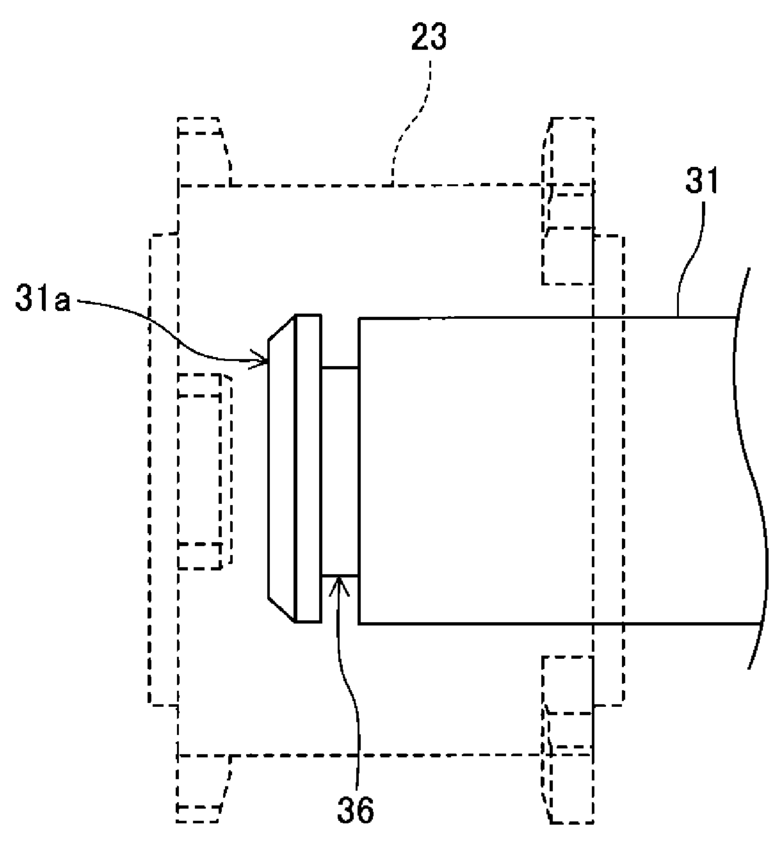
FIG. 20 is a plan view of a rotation shaft and a pulley according to a comparative example of a fifth modification of an embodiment of the present disclosure, viewed from the side opposite the side on which a leading flat portion and a trailing flat portion are formed.

In particular, as illustrated in FIG. 20, when an assembly operator inserts the rotation shaft 31 into the insertion hole 23*a* in the pulley 23 while looking at the rotation shaft 31 and the pulley 23 from the side opposite to the side on which the leading flat portion 32 and the trailing flat portion 33 are formed, the assembly operator cannot see the stopper wall 35 of the rotation shaft 31. Accordingly, inconvenience may occur that the pulley 23 is not pushed (inserted) until the entrance end surface 23*b* of the pulley 23 contacts the stopper wall 35 and that the pushing (insertion) is stopped in the middle.

As described in the above-described second modification, in the configuration in which the length W1 of the leading flat portion 32, which is a non-press-fit portion, in the axial direction is relatively long, an assembly operator is likely to misunderstand arbitrarily that the pulley 23 is inserted by a certain amount so that further pressing (insertion) may be unnecessary. Accordingly, inconvenience may occur that the pulley 23 is not pushed (inserted) until the entrance end surface 23*b* of the pulley 23 contacts the stopper wall 35 and that the pushing (insertion) is stopped in the middle.

Figure 21:
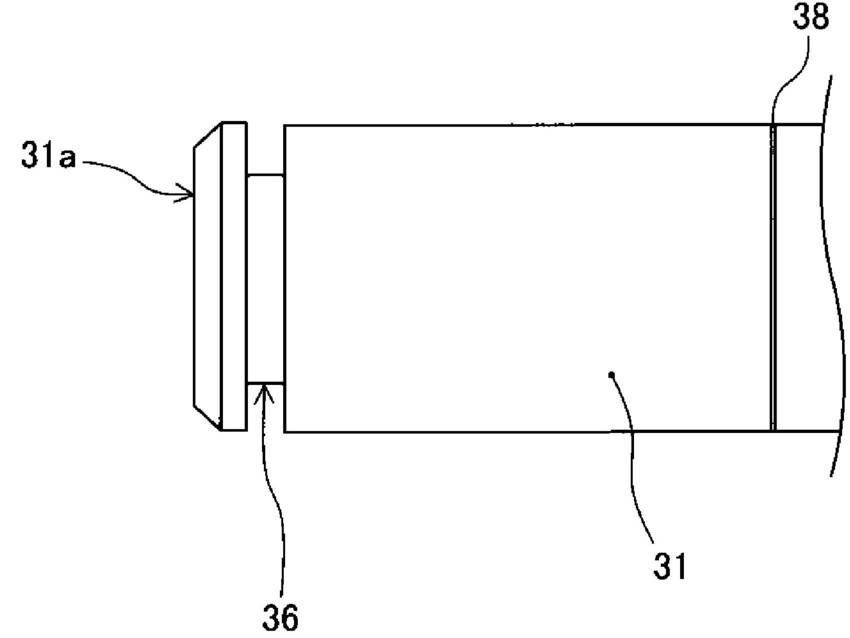
FIG. 21 is a plan view of a rotation shaft according to the fifth modification viewed from the side opposite the side on which a leading flat portion and a trailing flat portion are formed.

FIG. 21 is a plan view of the rotation shaft 31 in the fifth modification viewed from the side opposite to the side on which the leading flat portion 32 and the trailing flat portion 33 are formed. As illustrated in FIG. 21, the rotation shaft 31 of the fifth modification is provided with a groove or marking line 38 as a mark indicating the position at which the rotation shaft 31 is inserted into the insertion hole 23*a* of the pulley 23 on the circumferential surface of the rotation shaft 31 (at a position viewed from the side opposite to the side on which the leading flat portion 32 and the trailing flat portion 33 are formed). In the fifth modification, for example, the groove or the marking line 38 is formed at the same position as the stopper wall 35 in the axial direction. A label may be formed by pasting or engraving as the mark.

Figure 22:
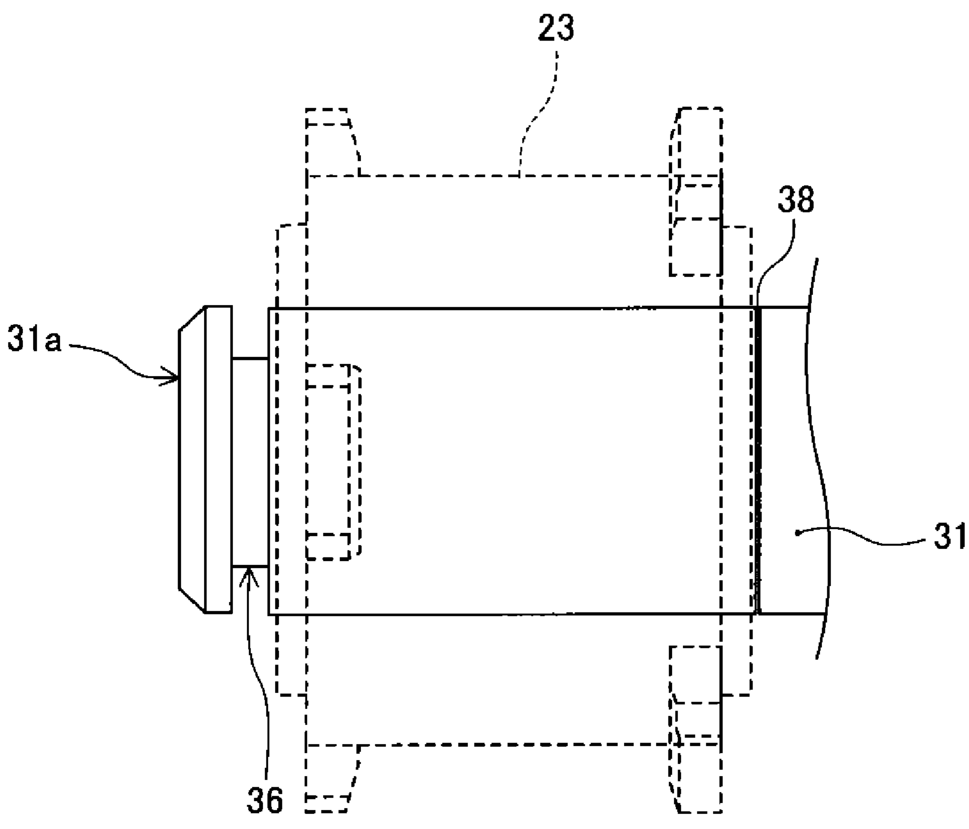
FIG. 22 is a plan view of the rotation shaft and the pulley according to the fifth modification, illustrating a state in which the pulley is appropriately pushed in until an entrance end surface of the pulley contacts a stopper wall of the rotation shaft, as viewed from the side opposite the side on which the leading flat portion and the trailing flat portion of the rotation shaft are formed.

According to this configuration, an assembly operator can recognize how far to push the pulley 23 by visually recognizing the groove or marking line 38. As a result, as illustrated in FIG. 22, the assembly operator can be prompted to press the pulley 23 until the entrance end surface 23*b* of the pulley 23 reaches at least the position of the groove or marking line 38 on the rotation shaft 31. When the assembly operator pushes the pulley 23 to the position of the groove or marking line 38, the entrance end surface 23*b* of the pulley 23 comes into contact with the stopper wall 35 of the rotation shaft 31. Thus, according to the fifth modification, an assembly operator can be prevented from stopping pushing of the pulley 23 in the middle.

The above-described embodiments are given as examples, and, for example, the following aspects of the present disclosure may have advantageous effects described below.

First Aspect

A drive transmission device (e.g., the driving mechanism 100) includes a drive transmission member (e.g., the pulley 23) to which a driving force is transmitted from a drive source and a rotation shaft (e.g., the rotation shaft 31) having a press-fit portion to be press-fitted into an insertion portion (e.g., the insertion hole 23*a*) of the drive transmission member after an axial tip (e.g., the axial tip 31*a*) of the rotation shaft is inserted into the insertion portion of the drive transmission member. The rotation shaft has a press-fit flat portion (e.g., the trailing flat portion 33) that constitutes part of the press-fit portion and is parallel to an axial direction of the rotation shaft. The insertion portion of the drive transmission member has an inner-wall flat portion (e.g., the inner-wall flat portion 41) to contact the press-fit flat portion when the press-fit portion is press-fitted into the insertion portion. The rotation shaft has another flat portion (e.g., the leading flat portion 32) at a position closer to the axial tip than the press-fit flat portion. The other flat portion (e.g., the leading flat portion 32) is parallel to the press-fit flat portion, has a distance from an axial center (e.g., the axial center C) of the rotation shaft smaller than the press-fit flat portion, and does not constitute the press-fit portion. As a comparative example, for example, it is conceivable that a drive transmission device has two flat portions that constitute a press-fit portion of a rotation shaft and a leading flat portion formed at a position close to an axial tip of the rotation shaft is closer to the axial center of the rotation shaft than a trailing flat portion formed at a position far from the axial tip of the rotation shaft. According to this configuration, when the rotation shaft is inserted into an insertion portion of a drive transmission member, the leading flat portion of the rotation shaft enters a region facing a trailing inner-wall flat portion of the insertion portion of the drive transmission member before the trailing flat portion of the rotation shaft enters the region. The trailing flat portion of the rotation shaft contacts the trailing inner-wall flat portion of the insertion portion when the press-fit portion is press-fitted to the insertion portion of the drive transmission member. Such entry causes the leading flat portion of the rotation shaft to be substantially parallel to the trailing inner-wall flat portion in the insertion portion of the drive transmission member, and the rotation position of the rotation shaft is restricted. As the rotation shaft is further inserted while the rotation position of the rotation shaft is restricted in this manner, the rotation shaft reaches the trailing flat portion and is press-fitted into the insertion portion while the trailing flat portion is substantially parallel to the trailing inner-wall flat portion. According to this configuration, before the trailing flat portion is inserted into the insertion portion (e.g., the insertion hole 23*a*) of the drive transmission member, the rotation position of the rotation shaft is adjusted by the leading flat portion so that the trailing flat portion of the rotation shaft and the trailing inner-wall flat portion of the drive transmission member are substantially parallel to each other, and the trailing flat portion and the trailing inner-wall flat portion can be press-fitted smoothly. Thus, assemblability of the drive transmission member with respect to the rotation shaft is enhanced. However, in the drive transmission device of the comparative example, the leading flat portion that performs the function of restricting the rotation position of the rotation shaft also constitutes the press-fit portion. Then, a leading inner-wall flat portion that is closer to the axial center of the rotation shaft than the trailing inner-wall flat portion is positioned downstream (a depth side) from the trailing inner-wall flat portion in the insertion direction in the insertion portion of the drive transmission member. Accordingly, a step is generated between the trailing inner-wall flat portion and the leading inner-wall flat portion. Assuming that such a step is generated, even if the rotation shaft only slightly rotates around the axis due to a gap generated when the leading inner-wall flat portion passes through the region facing the trailing inner-wall flat portion, the leading flat portion is caught by the step, and thus assemblability is deteriorated. In the first aspect, the rotation shaft (e.g., the rotation shaft 31) has another flat portion (e.g., the leading flat portion 32) that is parallel to the press-fit flat portion (e.g., the trailing flat portion 33) and that is closer to the axial center of the rotation shaft than the press-fit flat portion. The other flat portion (e.g., the leading flat portion 32) is disposed at a position closer to the axial tip (e.g., the axial tip 31*a*) of the rotation shaft than the press-fit flat portion constituting the press-fit portion. The other flat portion (e.g., the leading flat portion 32) according to the first aspect can also perform the function of restricting the rotation position of the rotation shaft (e.g., the rotation shaft 31) such that the other flat portion is substantially parallel to the inner-wall flat portion (e.g., the inner-wall flat portion 41) when the other flat portion passes through the region facing the inner-wall flat portion corresponding to the press-fit flat portion (e.g., the trailing flat portion 33) in the insertion portion (e.g., the insertion hole 23*a*) of the drive transmission member (e.g., the pulley 23). Accordingly, also in the first aspect, similarly to the comparative example, the press-fit flat portion (e.g., the trailing flat portion 33) and the inner-wall flat portion (e.g., the inner-wall flat portion 41) corresponding to the press-fit flat portion can be press-fitted smoothly, and thus the assemblability of the drive transmission member (e.g., the pulley 23) with respect to the rotation shaft (e.g., the rotation shaft 31) is preferable. In addition, according to the first aspect, the other flat portion (e.g., the leading flat portion 32) of the rotation shaft (e.g., the rotation shaft 31) does not constitute a press-fit portion, the inner-wall flat portion (e.g., the inner-wall flat portion 41) corresponding to the other flat portion does not need to be provided in the insertion portion (e.g., the insertion hole 23*a*) of the drive transmission member (e.g., the pulley 23). Accordingly, the step with which the other flat portion (e.g., the leading flat portion 32) is caught can be eliminated. As a result, according to the first aspect, there is fewer or no places on which the other flat portion (e.g., the leading flat portion 32) is caught in the insertion portion (e.g., the insertion hole 23*a*) of the drive transmission member (e.g., the pulley 23), and thus assemblability is enhanced as compared with the comparative example.

Second Aspect

In the drive transmission device (e.g., the driving mechanism 100) according to the first aspect, the insertion portion (e.g., the insertion hole 23*a*) of the drive transmission member (e.g., the pulley 23) is formed with a through hole. An inner-wall flat portion (e.g., the inner-wall flat portion 41) that is closer to the axial center of the rotation shaft (e.g., the rotation shaft 31) than the inner-wall flat portion is not provided inside the through hole. According to this configuration, even if the axial tip (e.g., the axial tip 31*a*) of the rotation shaft (e.g., the rotation shaft 31) is inserted from any opening of the insertion portion (e.g., the insertion hole 23*a*) of the drive transmission member (e.g., the pulley 23), an inner-wall flat portion (e.g., the inner-wall flat portion 41) that is closer to the axial center of the rotation shaft (e.g., the rotation shaft 31) than the inner-wall flat portion corresponding to the press-fit flat portion (e.g., the trailing flat portion 33) is not provided in the region that the other flat portion (e.g., the leading flat portion 32) faces during the period from the insertion of the axial tip (e.g., the axial tip 31*a*) into the insertion portion of the drive transmission member to the press-fitting of the press-fit portion into the insertion portion. Accordingly, even if the axial tip (e.g., the axial tip 31*a*) of the rotation shaft (e.g., the rotation shaft 31) is inserted from any opening of the insertion portion (e.g., the insertion hole 23*a*) of the drive transmission member (e.g., the pulley 23), there are fewer or no places on which the other flat portion (e.g., the leading flat portion 32) of the rotation shaft (e.g., the rotation shaft 31) is caught in the insertion portion (e.g., the insertion hole 23*a*) of the drive transmission member (e.g., the pulley 23), and thus assemblability is enhanced as compared with the comparative example. As a result, the drive transmission member (e.g., the pulley 23) is properly assembled regardless of the direction of the drive transmission member, and higher assemblability can be achieved.

Third Aspect

In the drive transmission device (e.g., the driving mechanism 100) according to the first or second aspect, the number of the press-fit flat portion (e.g., the trailing flat portion 33)

is only one. According to this configuration, a configuration in which the drive transmission member (e.g., the pulley 23) can be properly assembled regardless of the direction of the drive transmission member can be easily achieved.

Fourth Aspect

In the drive transmission device (e.g., the driving mechanism 100) according to any one of the first to third aspects, the rotation shaft (e.g., the rotation shaft 31) has an inclined surface (e.g., the inclined surface 34) that connects the other flat portion (e.g., the leading flat portion 32) and the press-fit flat portion (e.g., the trailing flat portion 33). According to this configuration, a step can be eliminated between the other flat portion (e.g., the leading flat portion 32) and the press-fit flat portion (e.g., the trailing flat portion 33). According to this configuration, a situation in which this step is caught in the insertion portion of the drive transmission member to impair assemblability can be avoided, and higher assemblability can be obtained.

Fifth Aspect

In the drive transmission device (e.g., the driving mechanism 100) according to the fourth aspect, an angle (e.g., the angle β) between the inclined surface (e.g., the inclined surface 34) and the other flat portion (e.g., the leading flat portion 32) at the most upstream position of the other flat portion (e.g., the leading flat portion 32) in the insertion direction of the axial tip (e.g., the axial tip 31*a*) and is equal to an angle (e.g., the angle α) between an inclined surface of the entrance edge portion (e.g., the entrance edge portion 42) and the inner-wall flat portion (e.g., the inner-wall flat portion 41) in the insertion portion of the drive transmission member (e.g., the pulley 23). According to the fifth aspect, the frictional force generated when the entrance edge portion (e.g., the entrance edge portion 42) of the insertion portion (e.g., the insertion hole 23*a*) of the drive transmission member (e.g., the pulley 23) slides on the inclined surface (e.g., the inclined surface 34) of the rotation shaft (e.g., the rotation shaft 31) during insertion can be decreased, and the load and catching during press-fitting can be reduced. Thus, higher assemblability can be obtained.

Sixth Aspect

In the drive transmission device (e.g., the driving mechanism 100) according to the fourth aspect, a height (e.g., the height H5) of the inclined surface (e.g., the inclined surface 34) relative to the other flat portion (e.g., the leading flat portion 32) at the most upstream position of the other flat portion (e.g., the leading flat portion 32) in the insertion direction of the axial tip (e.g., the axial tip 31*a*) is equal to a height (e.g., the height H4) of an inclined surface of the entrance edge portion (e.g., the entrance edge portion 42) relative to the inner-wall flat portion (e.g., the inner-wall flat portion 41) in the insertion portion of the drive transmission member (e.g., the pulley 23). According to the sixth aspect, a height at which the entrance edge portion (e.g., the entrance edge portion 42) of the insertion portion (e.g., the insertion hole 23*a*) of the drive transmission member (e.g., the pulley 23) rides on the press-fit flat portion (e.g., the trailing flat portion 33) along the inclined surface (e.g., the inclined surface 34) of the rotation shaft (e.g., the rotation shaft 31) can be lowered, and the load and catching during press-fitting can be reduced. Thus, higher assemblability can be obtained.

Seventh Aspect

In the drive transmission device (e.g., the driving mechanism 100) according to any one of the first to sixth aspects, a length (e.g., the length W2) of the press-fit flat portion (e.g., the trailing flat portion 33) in the axial direction is longer than a length (e.g., the length W1) of the other flat portion (e.g., the leading flat portion 32) in the axial direction. According to this configuration, while the press-fit flat portion (e.g., the trailing flat portion 33) has an axial length large enough to exert a force to hold the drive transmission member (e.g., the pulley 23) by press-fitting, the other flat portion (e.g., the leading flat portion 32) that does not constitute the press-fit flat portion has an axial length as short as possible in a range in which an axial length large enough to restrict rotation of the rotation shaft (e.g., the rotation shaft 31) in the insertion portion of the drive transmission member can be ensured. Thus, size reduction in the axial direction can be achieved.

Eighth Aspect

In the drive transmission device (e.g., the driving mechanism 100) according to any one of the first to sixth aspects, a length (e.g., the length W2) of the press-fit flat portion (e.g., the trailing flat portion 33) in the axial direction is equal to a length (e.g., the length W1) of the other flat portion (e.g., the leading flat portion 32) in the axial direction or less. According to this configuration, the axial length (e.g., the length W2) of the press-fit flat portion (e.g., the trailing flat portion 33) can be made as short as possible, and the press-fit length (press-in amount) in press-fitting the rotation shaft (e.g., the rotation shaft 31) into the insertion portion (e.g., the insertion hole 23*a*) of the drive transmission member (e.g., the pulley 2) can be shortened within a range in which the force for holding the drive transmission member on the rotation shaft by press-fitting can be sufficiently exerted. Thus, the assembly time can be shortened. The axial length (e.g., the length W1) of the other flat portion (e.g., the leading flat portion 32) can be made long, so that the press-fit flat portion (e.g., the trailing flat portion 33) of the rotation shaft (e.g., the rotation shaft 31) and the inner-wall flat portion (e.g., the inner-wall flat portion 41) of the drive transmission member (e.g., the pulley 23) are stably maintained to be substantially parallel before the press-fitting. Thus, the press-fitting can be more smoothly performed. As a result, the assemblability is enhanced.

Ninth Aspect

In the drive transmission device (e.g., the driving mechanism 100) according to any one of the first to eighth aspects, the insertion portion (e.g., the insertion hole 23*a*) of the drive transmission member (e.g., the pulley 23) is formed with a through hole. The rotation shaft (e.g., the rotation shaft 31) has a groove (e.g., the groove 36) in a portion that is placed outside the insertion portion after the rotation shaft passes through the insertion portion and is press-fitted. A stopper (e.g., the stopper 25) for preventing the rotation shaft from disengaging from the insertion portion is fitted in the groove. The other flat portion (e.g., the leading flat portion 32) has a flat part positioned closer to the axial tip (e.g., the axial tip 31*a*) in the axial direction than the position of the groove (e.g., the groove 36) in the axial direction. Due to the presence of such a flat part, when the insertion of the axial tip (e.g., the axial tip 31*a*) of the rotation shaft (e.g., the rotation shaft 31) into the insertion portion (e.g., the insertion hole 23*a*) of the drive transmission member (e.g., the pulley 23) is started, the flat part of the other flat portion (e.g., the leading flat portion 32) enters the insertion portion ahead of an edge of the groove (e.g., the groove 36). According to this configuration, the flat part is inserted along the inner-wall flat portion (e.g., the inner-wall flat portion 41) in the insertion portion (e.g., the insertion hole 23*a*), so that a situation in which the edge of the groove (e.g., the groove 36) is caught by an entrance edge portion (e.g., the entrance edge portion 42) of the insertion portion of the drive transmission member (e.g., the pulley 23) can be avoided. As a result, higher assemblability can be achieved.

Tenth Aspect

In the drive transmission device (e.g., the driving mechanism 100) according to any one of the first to nineth aspects, the drive transmission member (e.g., the pulley 23) is a belt pulley. According to this configuration, the assemblability of the belt pulley to the rotation shaft (e.g., the rotation shaft 31) can be enhanced.

Eleventh Aspect

In the drive transmission device (e.g., the driving mechanism 100) according to any one of the first to nineth aspects, the drive transmission member (e.g., the pulley 23) is a gear. According to this configuration, the assemblability of the gear with respect to the rotation shaft (e.g., the rotation shaft 31) can be enhanced.

Twelfth Aspect

In the drive transmission device (e.g., the driving mechanism 100) according to any one of the first to eleventh aspects, the drive transmission member (e.g., the pulley 23) is a resin-molded product. The drive transmission member (e.g., the pulley 23) is a resin-molded product, the dimension (the distance H3 from the pulley center F) of the inner-wall flat portion (e.g., the inner-wall flat portion 41) in the insertion portion (e.g., the insertion hole 23*a*) of the drive transmission member can be finely adjusted after molding, and thus a component with higher assemblability can be obtained.

Thirteenth Aspect

In the drive transmission device (e.g., the driving mechanism 100) according to any one of the first to twelfth aspects, the insertion portion (e.g., the insertion hole 23*a*) of the drive transmission member (e.g., the pulley 23) is formed with a through hole. When the through hole is viewed from the axial direction, a distance (e.g., the distance H1) between the axial center of the rotation shaft (e.g., the rotation shaft 31) and the other flat portion (e.g., the leading flat portion 32) of the rotation shaft, a distance (e.g., the distance H2) between the axial center of the rotation shaft and the press-fit flat portion (e.g., the trailing flat portion 33) of the rotation shaft, and a distance (e.g., the distance H3) between the center of the through hole and the inner-wall flat portion (e.g., the inner-wall flat portion 41) satisfy the relation of H1≤H3<2. According to this configuration, a drive transmission device (e.g., the driving mechanism 100) can be provided in which the assemblability of the drive transmission member (e.g., the pulley 23) with respect to the rotation shaft (e.g., the rotation shaft 31) is high.

Fourteenth Aspect

In the drive transmission device (e.g., the driving mechanism 100) according to any one of the first to thirteenth aspects, the rotation shaft (e.g., the rotation shaft 31) has a mark (e.g., a groove or marking line 38) indicating an insertion position of the rotation shaft with respect to the insertion portion of the drive transmission member (e.g., the pulley 23). According to this configuration, an assembly operator can recognize how far the drive transmission member (e.g., the pulley 23) is to be pushed by visually recognizing the mark (e.g., a groove or a marking line 38), and as a result, can be prompted to push the drive transmission member to an appropriate position. Such a configuration can prevent an assembly operator from stopping pushing of the drive transmission member (e.g., the pulley 23) in the middle.

Fifteenth Aspect

An image forming apparatus (e.g., printer) includes the drive transmission device (e.g., the driving mechanism 100) according to any one of the first to fourteenth aspects that transmits a driving force of a drive source to a driven member (e.g., a duplex entrance roller pair 13, a duplex intermediate roller pair 14, and a duplex exit roller pair 15) and forms an image on a recording medium (e.g., sheet P). According to this configuration, an image forming apparatus (e.g., printer) having high assemblability can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A drive transmission device comprising:

a drive transmission member to receive a driving force from a drive source, the drive transmission member having an insertion portion; and a rotation shaft that is inserted into the insertion portion to be held, the rotation shaft having a D-cut shape extending in an axial direction of the rotation shaft from an endmost surface of a tip end of the rotation shaft that is perpendicular to a longitudinal axis of the rotation shaft, with a rounded segment extending in the axial direction and with flat portions arranged at different positions in the axial direction, the rotation shaft including:

a first shaft portion along the axial direction having a first flat portion extending in the axial direction from the tip end, and a second shaft portion along the axial direction having a first inclined surface extending in the axial direction from the first flat portion and being inclined with respect to the first flat portion; and a second flat portion extending in the axial direction from the first inclined surface and being pressed in contact with the insertion portion, wherein the second flat portion is parallel to the first flat portion that has a distance from an axial center of the rotation shaft smaller than the second flat portion, wherein the insertion portion has a D-cut shape where an inner-wall surface comprises an inner-wall flat portion and an inner-wall rounded portion, and further has an entrance edge portion and an exit edge portion opposite the entrance edge portion, wherein the D-cut shape of the insertion portion extends from the entrance edge portion to the exit edge portion, and wherein the inner-wall flat portion contacts the second flat portion when the second flat portion is press-fitted into the insertion portion.

2. The drive transmission device according to claim 1, wherein an angle between the first inclined surface and the first flat portion at a most upstream position of the first flat portion in a direction of insertion of the tip end is equal to or lower than an angle between a second inclined surface of the entrance edge portion and the inner-wall flat portion of the drive transmission member.

3. The drive transmission device according to claim 1, wherein a height of the first inclined surface relative to the first flat portion at a most upstream position of the first flat portion in a direction of insertion of the tip end is equal to or less than a height of a second inclined surface of the entrance edge portion relative to the inner-wall flat portion of the drive transmission member.

4. The drive transmission device according to claim 1, wherein a length of the second flat portion in the axial direction is longer than a length of the first flat portion in the axial direction.

5. The drive transmission device according to claim 1, wherein the second flat portion extends from the first inclined surface to a stopper wall opposite the first inclined surface in the axial direction.

6. The drive transmission device according to claim 1, further comprising a stopper to prevent the rotation shaft from disengaging from the insertion portion, wherein the first shaft portion has a circumferential groove placed outside the insertion portion after the rotation shaft passes through the insertion portion and is press-fitted, the stopper is fitted in the circumferential groove, and a position of the circumferential groove in the axial direction is closer to the tip end than the first inclined surface.

7. The drive transmission device according to claim 1, wherein the drive transmission member is one of a belt pulley or a gear.

8. The drive transmission device according to claim 1, wherein the drive transmission member is a resin-molded product.

9. The drive transmission device according to claim 1, wherein the insertion portion of the drive transmission member is formed with a through hole, and wherein a relation of H1≤H3<H2 is satisfied, where when the through hole is viewed from the axial direction, H1 represents a distance between the axial center of the rotation shaft and the first flat portion of the rotation shaft, H2 represents a distance between the axial center of the rotation shaft and the second flat portion of the rotation shaft, and H3 represents a distance between a center of the through hole and the inner-wall flat portion.

10. The drive transmission device according to claim 1, wherein the rotation shaft has a mark indicating an insertion position of the rotation shaft with respect to the insertion portion of the drive transmission member.

11. An image forming apparatus for forming an image on a recording medium, the apparatus comprising:

a driven member; and the drive transmission device according to claim 1 to transmit the driving force of the drive source to the driven member.

12. The drive transmission device according to claim 1, wherein the first shaft portion has a circumferential groove in the rounded segment, and a first rounded portion of the rounded segment and a second rounded portion of the rounded segment on opposing sides of the circumferential groove have a same distance from the axial center of the rotation shaft.

13. The drive transmission device according to claim 12, further comprising a stopper fitted in the circumferential groove preventing the rotation shaft from disengaging from the insertion portion.

14. The drive transmission device according to claim 1, wherein:

the entrance edge portion is inclined so as to widen, in a direction from inside toward outside, relative to a diameter of the inner-wall surface, and the exit edge portion is inclined so as to widen, in a direction from the inside toward the outside, relative to the diameter of the inner-wall surface.

15. The drive transmission device according to claim 14, wherein the insertion portion has a symmetrical shape.

16. A drive transmission device comprising:

a drive transmission member to receive a driving force from a drive source, and a rotation shaft that is inserted into an insertion portion of the drive transmission member to be held, the rotation shaft having a D-cut shape with a rounded segment extending in an axial direction of the rotation shaft, and with flat portions arranged at different positions in the axial direction, the rotation shaft including:

a first shaft portion along the axial direction having a first flat portion, the first flat portion extending in the axial direction from an endmost surface of a tip end of the rotation shaft that is perpendicular to a longitudinal axis of the rotation shaft, and a second shaft portion along the axial direction having a first inclined surface extending in the axial direction from the first flat portion and being inclined with respect to the first flat portion, and a second flat portion extending in the axial direction from the first inclined surface, wherein the insertion portion has a D-cut shape where an inner-wall surface comprises an inner-wall flat portion and an inner-wall rounded portion, and further has an entrance edge portion and an exit edge portion opposite the entrance edge portion with a second inclined surface, where in the D-cut shape of the insertion portion extends from the entrance edge portion to the exit edge portion, wherein the inner-wall flat portion contacts the second flat portion when the second flat portion is press-fitted into the insertion portion, and wherein, after the first shaft portion of the rotation shaft passes a second inclined surface of the entrance edge portion, the second inclined surface is pressed in contact with the first inclined surface of the rotation shaft and the rotation shaft is inserted while the drive transmission member is being deformed.

17. The drive transmission device according to claim 16, wherein an angle between the first inclined surface and the first flat portion at a most upstream position of the first flat portion in a direction of insertion of the tip end is equal to or lower than an angle between the second inclined surface of the entrance edge portion and the inner-wall flat portion of the drive transmission member.

18. The drive transmission device according to claim 16, wherein a height of the first inclined surface relative to the first flat portion at a most upstream position of the first flat portion in a direction of insertion of the tip end is equal to or less than a height of the second inclined surface of the entrance edge portion relative to the inner-wall flat portion of the drive transmission member.

19. An image forming apparatus for forming an image on a recording medium, the apparatus comprising:

a driven member; and the drive transmission device according to claim 16 to transmit the driving force of the drive source to the driven member.

20. The drive transmission device according to claim 16, where in the insertion portion has a symmetrical shape.

* * * * *